(12) United States Patent
Maruyama

(10) Patent No.: US 6,346,957 B1
(45) Date of Patent: Feb. 12, 2002

(54) OPTICAL SCANNING DEVICE AND IMAGE FORMING APPARATUS THAT RESTRAINS COLOR ABERRATIONS

(75) Inventor: Koji Maruyama, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/518,184

(22) Filed: Mar. 2, 2000

(30) Foreign Application Priority Data

Mar. 16, 1999 (JP) ............................................. 11-069599
Dec. 9, 1999 (JP) ............................................. 11-350688

(51) Int. Cl.⁷ ......................... G03G 15/01; G03G 15/04
(52) U.S. Cl. ..................... 347/115; 347/134; 347/232; 347/241; 359/204
(58) Field of Search ................................. 347/115, 116, 347/117, 118, 119, 134, 232, 233, 241, 242, 243; 359/204

(56) References Cited

U.S. PATENT DOCUMENTS 5,450,119 A * 9/1995 Hinton et al. ............... 347/242
5,784,094 A * 7/1998 Ota et al. .................... 347/243
5,995,267 A * 11/1999 Pauli .......................... 359/204

FOREIGN PATENT DOCUMENTS

JP    A-10-20608    1/1998

* cited by examiner

Primary Examiner—Joan Pendegrass
(74) Attorney, Agent, or Firm—Oliff & Berridge, PLC

(57) ABSTRACT

The invention provides an optical scanning device for color image formation in which color aberration depending on the variation in the image formation position on the scanned surface caused by the angle change of the optical system. The optical scanning device includes a semiconductor laser array for emitting four light beams, a collimator lens for converging the light beams, a cylindrical lens for converging the light beams, a mirror for changing the optical path of the light beam, a polygon mirror for deflecting the light beam, an fθ lens for focusing the deflected light beams in the fast-scanning direction to be scanned on the exposure lines of photoreceptor drums, a separating polygon mirror for separating the light beams passed through the fθ lens from each other toward the respective photoreceptor drums, and beam corresponding optical systems including reflecting members having two mirror surfaces for reflecting the corresponding light beams one time each, which are adapted to guide the separated light beams to scanned surfaces of the photoreceptor drums.

14 Claims, 18 Drawing Sheets

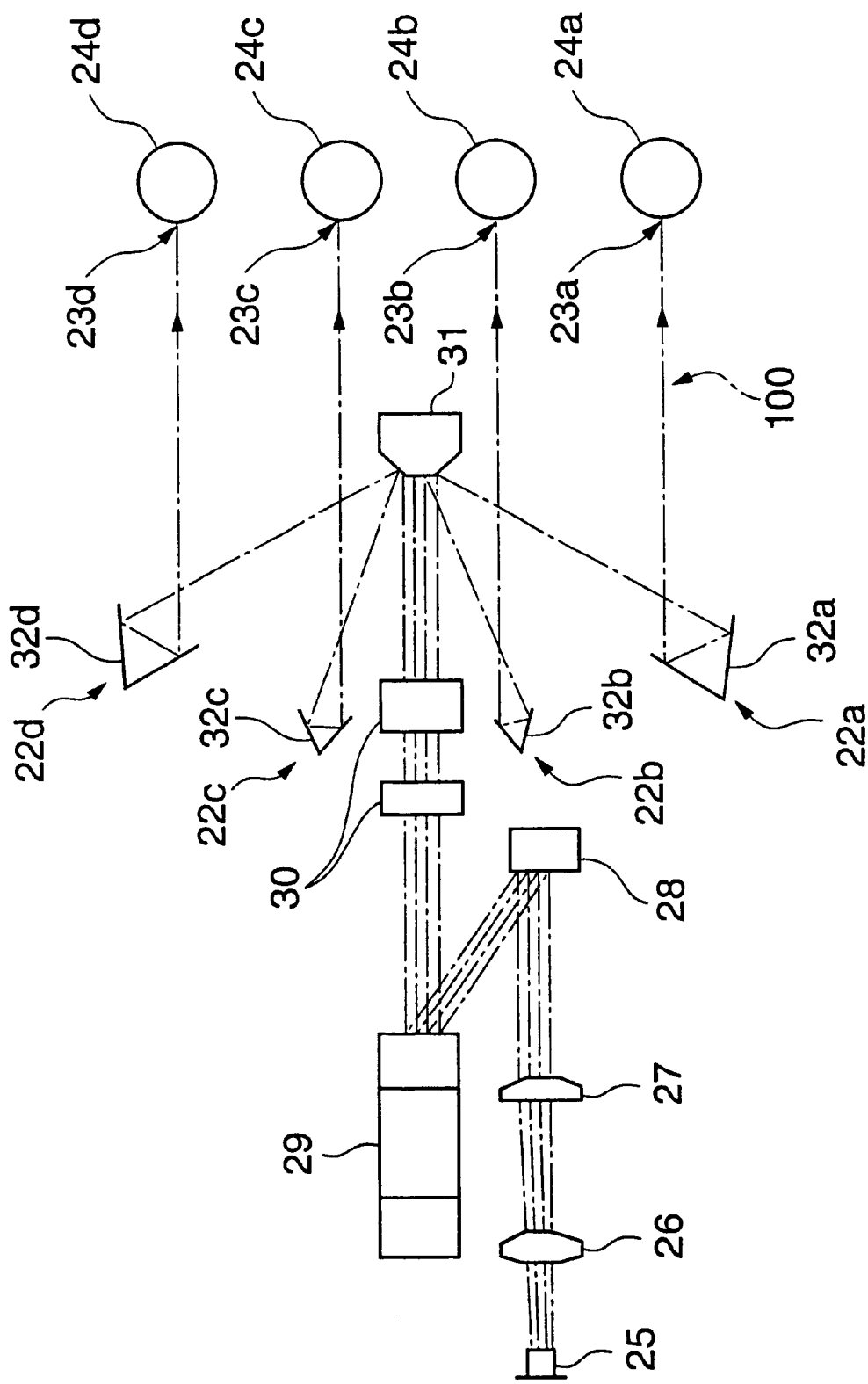

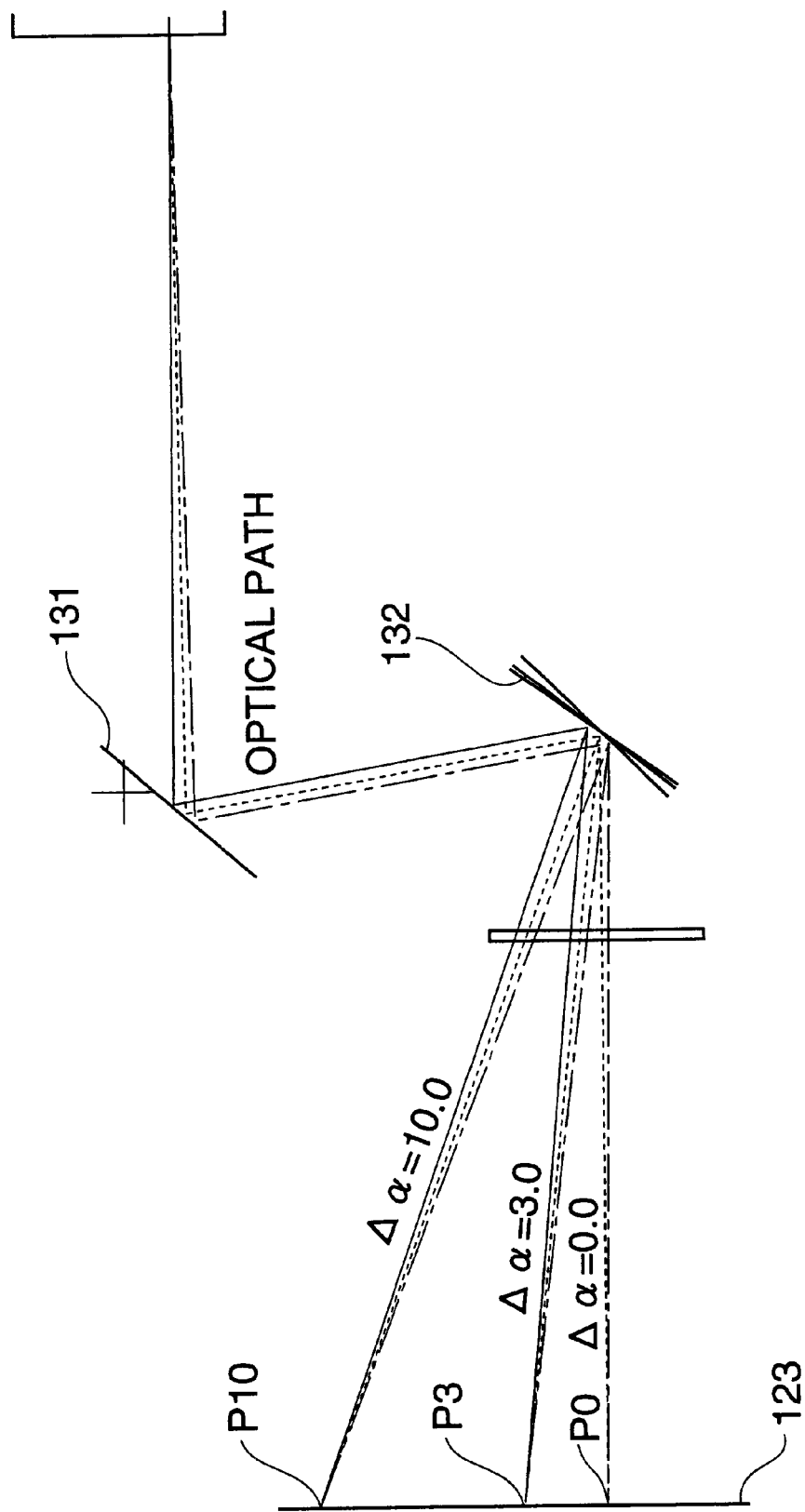

PRIOR ART

TEMPERATURE GRADIENT IN THE DIRECTION OF X-AXIS

TEMPERATURE GRADIENT IN THE DIRECTION OF Z-AXIS

OPTICAL SCANNING DEVICE AND IMAGE FORMING APPARATUS THAT RESTRAINS COLOR ABERRATIONS

FIELD OF THE INVENTION

1. Field of the Invention

This invention relates to an optical scanning device used in a color image forming apparatus such as an electrophotographic color copying machine and a color printer and an image forming apparatus for forming an image by the optical scanning device.

2. Description of the Related Art

As a color image forming apparatus such as a color copying machine and a color printer, widely known is the so-called tandem color image forming apparatus in which plural photoreceptors are arranged side by side in a designated direction, toner images of different colors are respectively formed on the plural photoreceptors, and the toner images are sequentially transferred on a transfer medium such as recording paper and an intermediate transfer belt to form a color image.

FIG. 9 is a schematic diagram of the conventional tandem color image forming apparatus.

As shown in FIG. 9, the color image forming apparatus includes photoreceptor drums 101a, 101b, 101c, 101d which are arranged in parallel in the transport direction B of recording paper 106 and on the surfaces of which electrostatic latent images of Y (yellow), M (magenta), C (cyan) and BK (black) colors are respectively formed, corotron chargers 102a, 102b, 102c, 102d for uniformly charging the respective photoreceptor drum surfaces, optical scanning devices 103a, 103b, 103c, 103d for emitting a laser beam modulated according to each image piece of Y, M, C, BK obtained by conducting designated processing for the color data of R (red), G (green), B (blue) to the respective photoreceptor drum surfaces, cylindrical mirrors 104a, 104b, 104c, 104d for respectively changing laser beams emitted from the optical scanning devices to an optical path heading toward the corresponding photoreceptor drum, developing devices 105a, 105b, 105c, 105d for developing the electrostatic latent images formed on the respective photoreceptor drum surfaces by irradiation of a laser beam with toner of Y, M, C, BK to form toner images, a transport belt 107 for transporting the recording paper 106 in the transport direction B along the tangential line common to the photoreceptor drums to transfer the toner images of the respective colors formed on the photoreceptors onto the recording paper 106, cleaners 108a, 108b, 108c 108d for removing toner remaining on the photoreceptor drums, and a fixing roll 109 for fixing the transferred images on the recording paper 106 transferred from the photoreceptors.

FIG. 10 is a schematic diagram of an optical scanning device used in the conventional color image forming apparatus.

FIG. 10 illustrates the optical scanning device 103a for Y color among four optical scanning devices used in the color image forming apparatus shown in FIG. 9. The other three optical scanning devices 103b, 103c, 103d have the substantially same constitution as the optical scanning device 103a, so the description will be omitted.

The optical scanning device 103a includes a light emission time control circuit 110 for controlling the light emission time of a laser beam according to the image data of Y color, a laser diode 111 controlled by the light emission time control circuit 110 to emit a modulated laser beam, a collimator lens 112 for converging a laser beam emitted from the laser diode 111, a cylindrical lens 113 for converging a laser beam converged by the collimator lens 112 to diffuse from a focal point, a polygon mirror 114 for deflecting a laser beam passed through the cylindrical lens 113, an fθ lens 115 for focusing a light beam deflected by the polygon mirror 114 in the fast-scanning direction to scan on the exposure line of the photoreceptor drum 101a at uniform speed, and a cylindrical mirror 104a for finally imaging a laser beam on the photoreceptor drum 101a.

The cylindrical mirror 104a used is so constructed that one face of a glass member like a rectangular parallelepiped is polished to be recessed like a cylindrical surface, and metal having high reflectance such as aluminum is deposited, and in some case, coating for further heightening the reflectance is conducted.

The operation of the color image forming apparatus shown in FIG. 9 will now be described. The surfaces of the photoreceptor drums 101a, 101b, 101c, 101d rotated in the direction of an arrow A are previously uniformly charged by the chargers 102a, 102b, 102c, 102d, and laser beams modulated according to the respective image data of Y, M, C, BK are emitted from the optical scanning devices 103a, 103b, 103c, 103d to the charged surfaces to form the electrostatic latent images on the surfaces of the photoreceptor drums. The electrostatic latent images are developed with toner of the respective colors by the developing devices 105a, 105b, 105c, 105d to form toner images on the photoreceptor drum surfaces. The toner images are supported on the photoreceptor drums to be transported to a transfer position where the photoreceptor drums come into contact with the recording paper 106. On the other hand, the recording paper 106 placed on the transport belt 107 is supported on the transport belt 107 to be fed to the transfer position of each photoreceptor drum in the same timing, whereby toner images of the respective colors on the photoreceptor drums are sequentially transferred onto the recording paper 106. The recording paper 106 to which the toner images are transferred is transported to the fixing roll 109, and the transferred images are fixed to obtain a color image.

The conventional tandem color image forming apparatus, however, has the problem that as the plural photoreceptor drums are exposed by the plural optical scanning devices corresponding thereto, the apparatus is increased in size leading to a cost increase. Further, a problem exists that as the optical elements constituting each optical scanning device are independently varied due to thermal deformation of an enclosure, the image formation position on the scanned surface of the photoreceptor drum is varied so that the image forming positions of the respective colors on the recording paper are shifted to remarkably lower the image quality.

Recently, as disclosed in Japanese Published Unexamined Patent Application No. Hei 10-20608, an optical scanning device has been proposed to reduce color aberration while reducing the size and the cost by making the optical parts related to plural laser beams for exposing the plural photoreceptor drums in common.

FIG. 11 is a schematic diagram of the conventional optical scanning device in which the optical parts are made in common.

As shown in FIG. 11, the optical scanning device is formed by a semiconductor laser array 125 or emitting four laser beams modulated according to each image data of Y (yellow), M (magenta), C (cyan) and BK (black), a polygon mirror 129 for commonly deflecting four laser beams emitted from the semiconductor laser array 125, an fθ lens 130 for focusing four light beams deflected by the polygon mirror 129 in the fast-scanning direction to scan on the exposure lines of the photoreceptor drums 124a, 124b, 124c, 124d at uniform speed, a separating polygon mirror 131 which is formed by combination of four mirror surfaces having four planes of incidence different in angle for the four laser beams passed through the fθ lens 130 and adapted to separate four laser beams from each other in the directions corresponding to the array positions of the photoreceptor drums, and cylindrical mirrors 132a, 132b, 132c, 132d for focusing for laser beams separated by the separating polygon mirror 131 in the slow-scanning direction to be imaged on the corresponding photoreceptor drums.

In the optical scanning device thus constructed, four laser beams modulated according to the image data of Y, M, C, BK are emitted from the semiconductor laser array 125, commonly deflected by the polygon mirror 129 to enter the separating polygon mirror 131 through the fθ lens 130, and separated in the directions corresponding to the array positions of the photoreceptor drums 124a, 124b, 124c, 124d by the separating polygon mirror 131. The separated four beams are respectively reflected by the cylindrical mirrors 132a, 132b, 132c, 132d and guided to the scanned surfaces 123a, 123b, 123b, 123d of the corresponding photoreceptor drums to expose the scanned surfaces 123a, 123b, 123c, 123d of the photoreceptor drums, thereby forming electrostatic latent images on the photoreceptor drums.

In the optical scanning device, however, though the optical system from the semiconductor laser array 125 to the separating polygon mirror 131 is used in common so as to hold down color aberration due to the change with the passage of time of the respective optical elements to the minimum, four cylindrical mirrors 132a, 132b, 132c, 132d are separately supported to easily cause independent change with the passage of time. Further, the cylindrical mirrors and the photoreceptor drums do not have optically conjugate relationship. Therefore, when the angle of the cylindrical mirror changes by $\Delta\alpha$, the advancing direction of light headed from the cylindrical mirror to the photoreceptor drum is changed by $2\Delta\alpha$ so that the image formation position on the photoreceptor drum is largely varied to cause great color aberration.

As the actual change with the passage of time of the cylindrical mirror, the change of angle and the change of position are considered. Among them, the major problem is the angle change, and among the angle changes taking the three directions of the fast-scanning direction, the slow-scanning direction and the direction of the optical axis as the axis of rotation, it is the angle change taking the fast-scanning direction as the axis of rotation that has a greater influence on the occurrence of color aberration. The reason is that in general thermal deformation, the difference in the position change between both ends of the cylindrical mirror is small, and since the cylindrical mirror is as comparatively long as about 190 mm long even with the A4 machine, the angle changes taking the slow-scanning direction and the direction of the optical axis as the axis of rotation are not so large.

SUMMARY OF THE INVENTION

The present invention has been made in view of the above circumstances and provides an optical scanning device for color image formation in which color aberration due to a change of the image formation position on a scanned surface caused by the angle change of the optical system is restrained.

The optical scanning device of the present invention includes a light beam emitting part for emitting plural light beams, a deflecting part for commonly deflecting the plural light beams emitted from the light beam emitting part, a separating optical system for separating the plural light beams deflected by the deflecting part from each other, and beam corresponding optical systems respectively corresponding to the plural light beams for guiding the plural light beams separated by the separating optical system to respective designated scanned surface, wherein each of the beam corresponding optical systems respectively includes a reflecting member having two mirror surfaces arranged like a V-shape for reflecting the corresponding light beam, one time each, among the plural light beams separated by the separating optical system.

In this arrangement, preferably one mirror surface of the two mirror surfaces is a concave cylindrical mirror surface, and the other mirror surface is a plane mirror surface.

Further, a preferable mode is that the cylindrical mirror surface is arranged on the downstream side of the optical path of a light beam from the plane mirror surface.

The optical scanning device of the present invention includes a light beam emitting unit for emitting plural light beams, a light beam deflecting unit for commonly deflecting the plural light beams emitted from the light beam emitting unit, a separating optical system for separating the plural light beams deflected in the light beam deflecting unit from each other, and beam corresponding optical systems respectively corresponding to the plural light beams, for guiding the plural light beams separated by the separating optical system to respective designated scanned surface, wherein the beam corresponding optical systems respectively have two mirror surfaces for reflecting the corresponding light beam, one time each, among the plural light beams separated by the separating optical system.

In this case, preferably the separating optical system is formed by a single separating optical element for separating the plural light beams from each other.

The two mirror surfaces may be fixed to a support member common to the two mirror surfaces, or the two mirror surfaces may be individually fixed to separate support members.

Preferably, the two mirror surfaces constituting the beam corresponding optical system are arranged on the same side of a space halved by the plane formed by the optical path of a light beam deflected at the light beam deflecting unit in each one beam corresponding optical system.

Preferably, the beam corresponding optical systems are respectively adapted to guide light beams separated by the separating optical system to the corresponding scanned surface through an optical path free from intersecting a plane formed by an optical path for a light beam deflected at the light beam deflecting unit.

Further, preferably, the separating optical system and the beam corresponding optical system are adapted to keep each optical path length of the plural light beams between each deflecting point at the light beam deflecting unit and the irradiated point on each scanned surface equal to each other.

The two mirror surfaces may be formed by the mirror surfaces of separate mirrors, or two mirror surfaces constituting one prism.

According to the present invention, the image forming apparatus includes plural photoreceptors where an electrostatic latent image is recorded by light beams modulated according to the image data, and is adapted to develop plural electrostatic latent images formed on the plural photoreceptors with toner of the respective colors to form toner images of the respective colors, and finally transfer and fix the respective toner images on a designated recording medium to record the images on a recording medium, wherein the image forming apparatus includes an optical scanning device having a light beam emitting unit for emitting plural light beams respectively modulated according to data of each image, a light beam deflecting unit for commonly deflecting the plural light beams emitted from the light beam emitting unit, a separating optical system for separating the plural light beams deflected by the light beam deflecting unit from each other, and beam corresponding optical systems respectively corresponding to the plural light beams for guiding the plural light beams separated by the separating optical system to the plural photoreceptors, respectively, the beam corresponding optical systems being respectively provided with two mirror surfaces for reflecting the corresponding light beam, one time each, among the plural light beams separated by the separating optical system.

BRIEF DESCRIPTION OF THE DRAWINGS

Preferred embodiments of the present invention will be described in detail based on the followings, wherein;

FIG. 1 is a schematic block diagram showing a first embodiment of an optical scanning device according to the present invention;

FIG. 4 is a diagram showing the optical path change of a light beam depending on the change of angle of the conventional cylindrical mirror shown in FIG. 11;

DESCRIPTION OF THE PREFERRED EMBODIMENTS

Figure 2A:
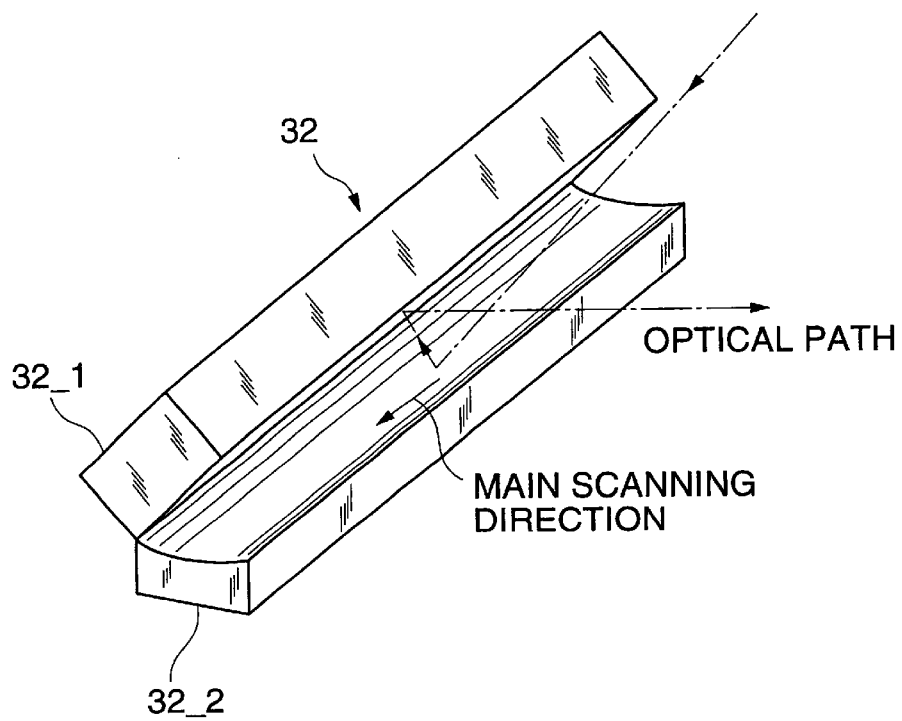
FIG. 2A is a perspective view of a beam corresponding optical system used in the first embodiment of the optical scanning device according to the present invention.

The embodiments of the invention will now be described.

FIG. 1 is a schematic block diagram showing a first embodiment of an optical scanning device according to the present invention.

As shown in FIG. 1, the optical scanning device includes a semiconductor laser array 25 for emitting four light beams modulated according to image data of Y (yellow), M (magenta), C (cyan) and BK (black), a collimator lens 26 for condensing four light beams emitted from the semiconductor laser array 25, a cylindrical lens 27 for condensing light beams condensed by the collimator lens 26 to diffuse from a focal point, a mirror 28 for changing the optical paths of four light beams passed through the cylindrical lens 27, a polygon mirror 29 for commonly deflecting four light beams from the mirror 28, an fθ lens 30 for focusing four light beams deflected by the polygon mirror 29 in the fast-scanning direction to be scanned at equal speed on the exposure lines of the photoreceptor drums 24a, 24b, 24c, 24d, a separating polygon mirror 31 which is formed by combination of four mirrors having four planes of incidence different in angle and adapted to separate four light beams passed through the fθ lens 30 from one another in the directions corresponding to the array positions of the respective photoreceptor drums, and beam corresponding optical systems 22a, 22b, 22c, 22d respectively corresponding to four light beams for guiding four light beams separated by the separating polygon mirror 31 to the scanned surfaces 23a, 23b, 23c, 23d of the respective photoreceptor drums.

The beam corresponding optical system 22a, 22b, 22c, 22d respectively include reflecting members 32a, 32b, 32c, 32d having two mirror surfaces arranged like a V-shape for reflecting the corresponding light beam, one time each, among four light beams separated by the separating polygon mirror 31 an edge 100 is shown, representing the edge of a plane formed by the optical path of light beam. The beam corresponding optical system 22a, 22b, 22c, 22d have the function similar to that of the cylindrical mirrors 132a, 132b, 132c, 132d in FIG. 11.

The separating polygon mirror 31 and the beam corresponding optical systems 22a, 22b, 22c, 22d have the structure and the arrangement positions determined to keep the respective optical path lengths between the reflecting deflection point of each light beam in the polygon mirror 29 and the scanned surfaces 23a, 23b, 23c, 23d of the photoreceptor drums 24a, 24b, 24c, 24d concerning four light beams shown in FIG. 1 equal to one another.

The components other than the beam corresponding optical systems are the same as those of the conventional optical scanning device shown in FIG. 11, so in the following, the detailed description of the components other than the beam corresponding optical system will be omitted.

The semiconductor laser array 25 in the embodiment corresponds to a light beam emitting part or a light beam emitting unit in the present invention, the polygon mirror 29 in the embodiment corresponds to the deflecting part or the light beam deflecting part in the present invention, and the separating polygon mirror 31 in the embodiment corresponds to the separating optical system.

Four light beams of Y, M, C, B are emitted from the semiconductor laser array 25 to enter the separating polygon mirror 31 through the polygon mirror 29 and the fθ lens 30, and separated in the directions corresponding to the array positions of the photoreceptor drums 24a, 24b, 24c, 24d by the separating polygon mirror 31. The separated four beams are reflected by the beam corresponding optical systems 22a, 22b, 22c, 22d to be guided to the scanned surfaces 23a, 23b, 23c, 23d of the corresponding photoreceptor drums, thereby exposing the scanned surfaces 23a, 23b, 23c, 23d of the previously charged photoreceptor drums to form electrostatic latent images on the respective photoreceptor drum surfaces. The beam corresponding optical systems 22b, 22c, 22d for M, C, BK, have the substantially same constitution as the beam corresponding optical system 22a, so the description of the systems will be omitted.

Figure 2B:
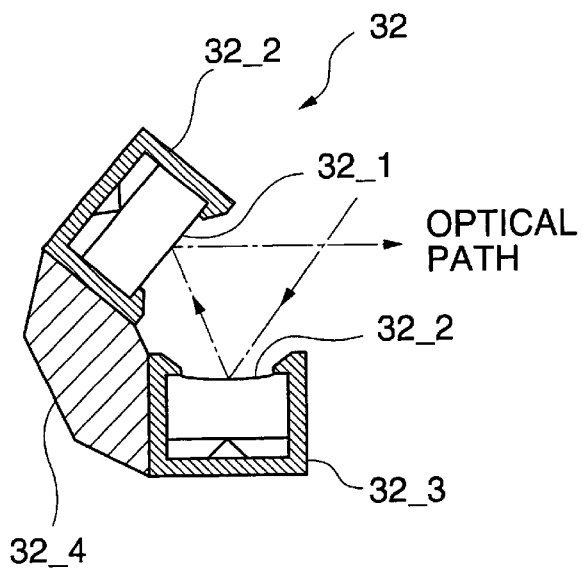
FIGS. 2B and 2C are diagrams showing the modified forms of the above.
Figure 2C:
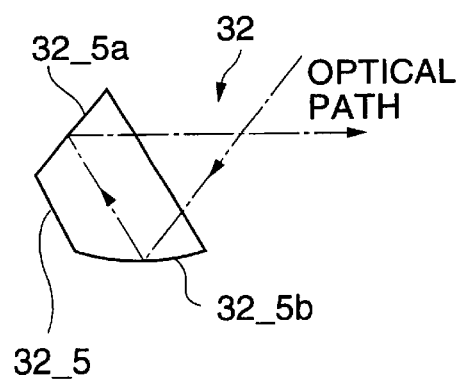

FIG. 2A is a perspective view of a beam corresponding optical system used in a first embodiment of an optical scanning device according to the present invention, and FIGS. 2B and 2C are diagrams showing modified forms thereof.

As shown in FIG. 2A, the beam corresponding optical system 22 includes a reflecting member 32 formed by arranging a plane mirror 32_1 and a cylindrical mirror 32_2 having a concave mirror surface like a V-shape with the side S parallel to the generating line of the cylindrical mirror 32_2 interposed between them, and the plane mirror 32_1 and the cylindrical mirror 32_2 are adapted to reflect a light beam corresponding to the beam corresponding optical system 22 one time each. The respective mirror surfaces of the plane mirror 32_1 and the cylindrical mirror 32_2 are arranged pointing to the inside of the V-shape, and the angle made between both mirror surfaces is determined to guide the light beam from the separating polygon mirror 31 to a designated image formation position on the scanned surface on the photoreceptor drum. Hereinafter, the unit having the plane mirror surface and the cylindrical mirror surface arranged like a V-shape is referred to as V-type cylindrical mirror.

It will be sufficient to construct the reflecting member 32 so that actually two mirror surfaces for reflecting a light beam have the V-shaped relative position relationship, and two mirror surfaces may be both plane mirror surfaces. However, as will be mentioned later, preferably one mirror surface of two mirror surfaces is formed as a recessed cylindrical mirror surface, and the other mirror surface is formed as a plane mirror surface, whereby color aberration can be restrained more effectively.

As shown in FIG. 2B, the plane mirror 32_1 and the cylindrical mirror 32_2 may be held by a holding member 32_3 and a reinforcement rib 32_4 without contact with each other.

Instead of forming the reflecting member 32 by two independent mirrors as shown in FIG. 2A and FIG. 2B, the reflecting member may be formed as shown in FIG. 2C by polishing one surface 32_5a of an elongated glass member 32_5 extending in the fast-scanning direction as a flat surface, polishing another surface 32_5b as a cylindrical surface, evaporating high reflectance material such as aluminum and copper on the surface 32_5a and the surface 32_5b, and forming the plane mirror surface and the cylindrical mirror surface on the inside of the glass member 32_5.

As the reflecting member of the beam corresponding optical system is thus constructed, the change of image formation position on the scanned surface depending on the angle change taking the fast-scanning direction as the axis of rotation can be reduced to the minimum.

FIG. 3 is a diagram for explaining the change of the image formation position depending on the angle change of the beam corresponding optical system in the first embodiment of the optical scanning device.

Figure 3A:
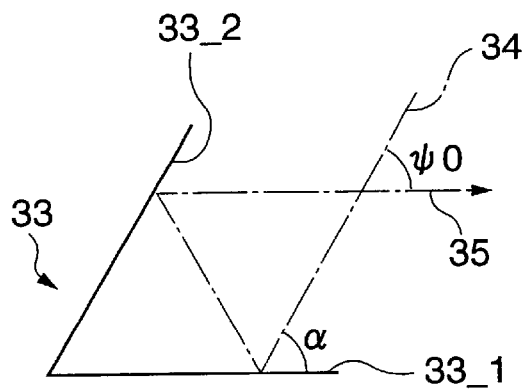
FIG. 3 is a diagram for explaining the change of the image formation position depending on the change of angle of the beam corresponding optical system in the first embodiment of the optical scanning device.
Figure 3B:
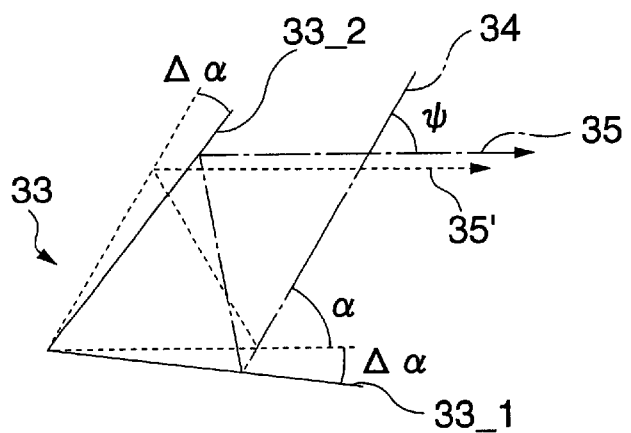

As shown in FIG. 3A, a the reflecting member 33 having two plane mirrors 33_1, 33_2 arranged like a V-shape with the mirror surfaces inside, an angle made between the incident light 34 and the reflected light 35 emitted after reflected by the plane mirrors 33_1, 33_2 one time each is taken to be $\psi_o$. Even if the reflecting member 33 is, as shown in FIG. 3B, rotated through an angle of $\Delta\alpha$ within the plane (plane parallel to the paper surface) vertical to both plane mirrors 33_1, 33_2, the angle $\psi$ is still the same angle as the angle $\psi_o$ before rotation so that the emitting direction of the reflected light will not change. In this case, however, the optical path of the reflected light 35 is changed to the same optical path as if the optical path of the reflected light 35' before the angle change is moved in parallel, so the image formation position on the photoreceptor drum is changed only for the parallel movement. Such a change of the image formation position caused by the parallel movement of the optical path is very small as compared with the change of the image formation position depending on the angle change of the reflecting member 33 to exert far little influence on the image misregistration.

Figure 3C:
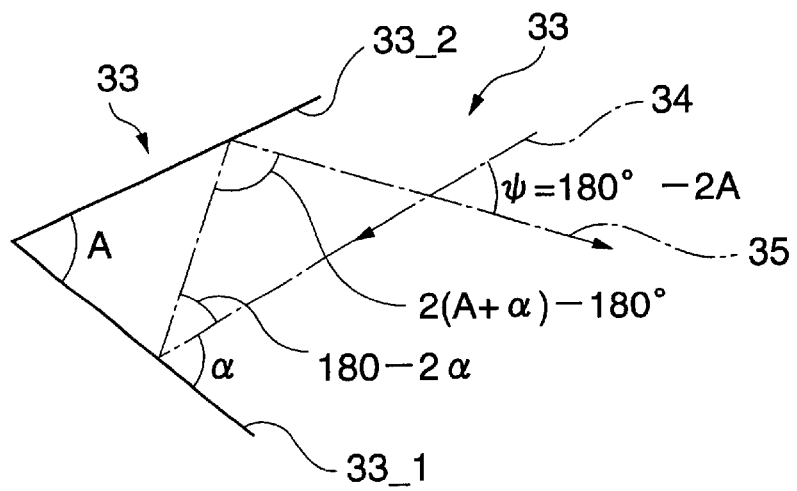

The reason why the angle $\psi$ will not change even if the reflecting member 33 is rotated through an angle of $\Delta\alpha$ can be easily described geometrically. That is, when the apex angle of two mirror surfaces of the reflecting member 33 is taken to be A, as shown in FIG. 3C, an angle $\psi$ made between the incident light 34 and the reflected light 35 is 180°—2A, which is not dependent on the angle of incidence on the first plane mirror 33_1.

In the case where one mirror surface of two plane mirror surfaces is a cylindrical mirror surface, the advancing direction of reflected light varies with the point of reflection due to its curved surface, so the angle $\psi$ in FIG. 3B is not invariable with respect to the angle change of the mirror. As far as the angle change due to the change with the passage of time is considered, shifting from the plane of the point of reflection is small so that the angle change compensation effect close to that in the case where both mirror surfaces are planes can be expected.

Figure 5:
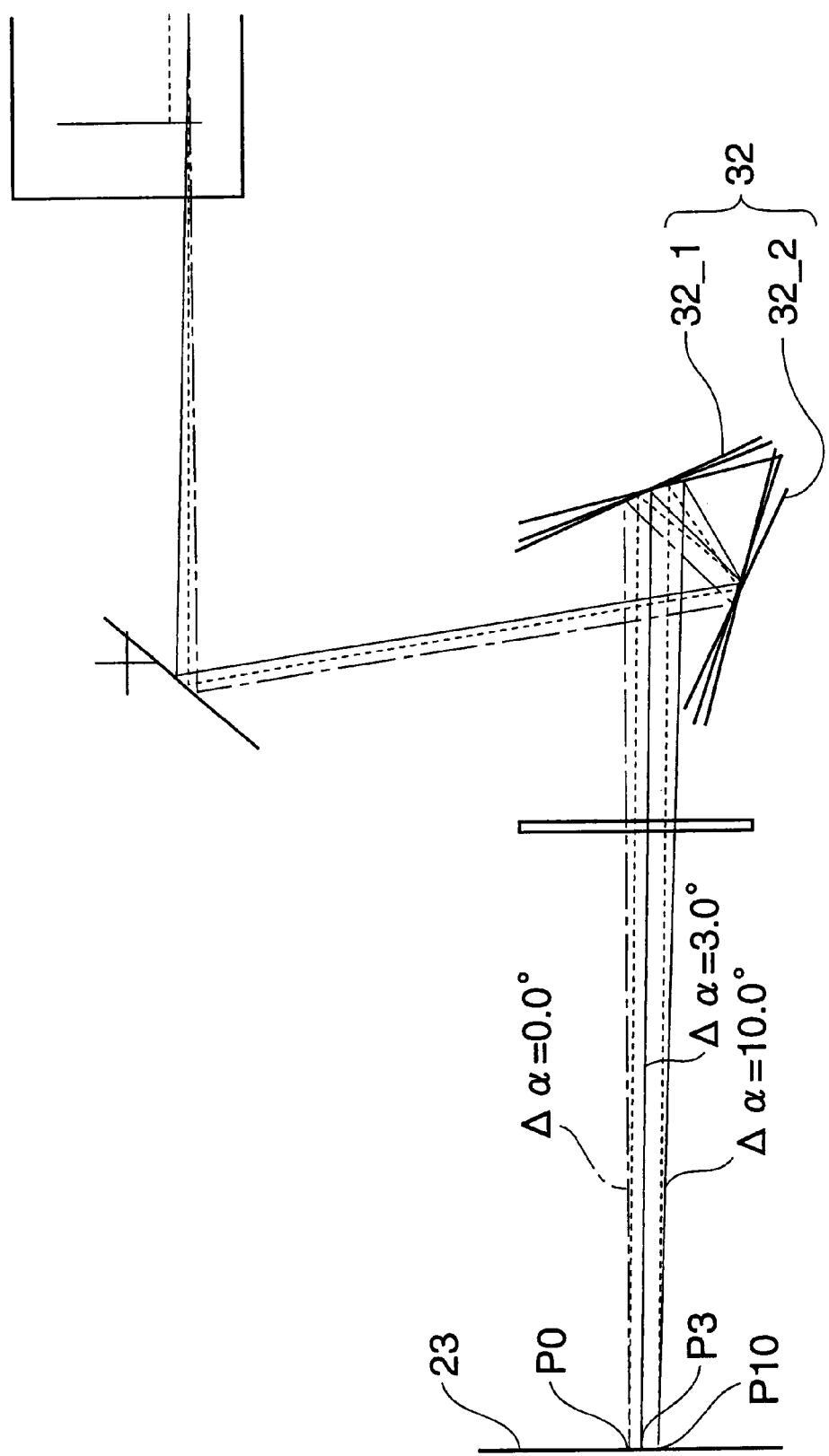
FIG. 5 is a diagram showing the optical path change of a light beam depending on the change of angle of the beam corresponding optical system in the first embodiment of the present invention.
Figure 11:
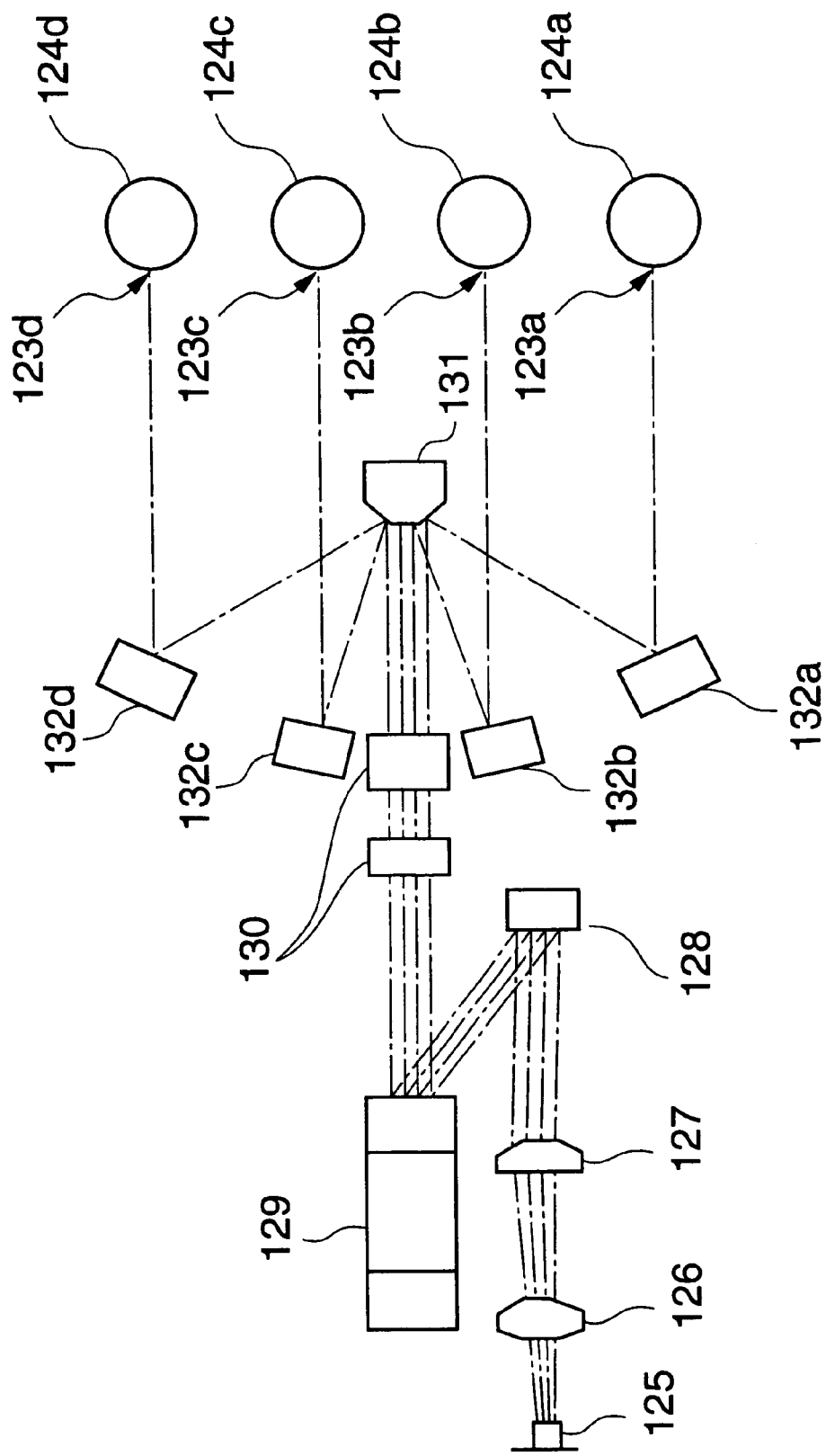
FIG. 11 is a schematic block diagram of the conventional optical scanning device in which the optical parts are made in common.

FIG. 4 is a diagram showing the change of optical path of a light beam depending on the angle change of the conventional cylindrical mirror shown in FIG. 11, and FIG. 5 is a diagram showing the change of optical path of a light beam depending on the angle change of the reflecting member in the first embodiment of the present invention. In both of FIG. 4 and FIG. 5, the angle change and the change of optical path are drawn to an extremely enlarged scale to make the effect of the present invention remarkable.

FIG. 4 shows how the optical path of a light beam changes in the case of rotating the cylindrical mirror 132 in the conventional optical scanning device clockwise by $\Delta\alpha=3.0°$ and in the case of rotating the same clockwise by $\Delta\alpha=10.0°$ and how the image formation points P3, P10 on the scanned surface 123a change as compared with the case of $\Delta\alpha=0.0°$.

On the other hand, FIG. 5 shows the change of optical path of a light beam and the change of the image formation positions P3, P10 on the scanned surface 123a in the case of similarly rotating the reflecting member 32 in the first embodiment of the invention clockwise by $\Delta\alpha=3.0°$ and in the case of rotating the same clockwise by $\Delta\alpha=10.0°$.

As shown in FIG. 5, it is known that the change of the image formation position in the first embodiment of the present invention is held down to very small as compared with the change of the image formation position in the conventional cylindrical mirror shown in FIG. 4.

Tables 1 to 4 show the calculation results of image formation position change with respect to the angle change of the V-type cylindrical mirror in the first embodiment in comparison with the conventional cylindrical mirror. In calculation, used is Code-V (manufactured by Optical Research Associates) which is general purpose optical design software. The changes are all shown in units of $\mu$m.

In Tables 1 to 4, the angle change $\Delta\alpha$ is expressed taking the clockwise rotating direction facing the paper surface of FIG. 4 to be positive, and the counter-clockwise rotating direction to be negative. The signs A, B, C, D showing light beams are put respectively corresponding to four light beams going toward the photoreceptor drums 24a, 24b, 24c, 24d in FIG. 1. The items other than the light beams are defined in the following.

LEAD REGI.: Scanning misregistration in the slow-scanning direction in the scanning position BOW: (the position of scanning center in the slow-scanning direction)−{(the position of scanning start point in the slow-scanning direction)+(the position of scanning end point in the slow-scanning direction)}÷2

SKEW: (the position of scanning start point in the slow-scanning direction)−(the position of scanning end point in the slow-scanning direction)

SIDE REGI.: Misregistration of scanning start point in the fast-scanning direction SCANNING WIDTH: (the position of scanning end point in the fast-scanning direction)−(the position of scanning start point in the fast-scanning direction)

TABLE 1

| $\Delta\alpha$[deg.] | Light beam | Lead regi. | Bow | Skew | Side regi. | Scanning width |
|---|---|---|---|---|---|---|
| V-type cylindrical mirror | | | | | | |
| −0.5 | A | −133.18 | 0.08 | 0.02 | 0.35 | −0.70 |
| −0.1 | A | −26.60 | 0.06 | 0.02 | 0.01 | −0.03 |
| −0.01 | A | −2.66 | 0.05 | 0.02 | 0 | 0 |
| 0.01 | A | 2.66 | 0.05 | 0.02 | 0 | 0 |
| 0.1 | A | 26.60 | 0.05 | 0.02 | 0.01 | −0.03 |
| 0.5 | A | 132.81 | 0.03 | 0.02 | 0.35 | −0.70 |

TABLE 1-continued

| $\Delta\alpha$[deg.] | Light beam | Lead regi. | Bow | Skew | Side regi. | Scanning width |
|---|---|---|---|---|---|---|
| Conventional cylindrical mirror | | | | | | |
| −0.5 | A | −1393.64 | −0.540 | 0.04 | −4.51 | 8.92 |
| −0.1 | A | −278.72 | −0.080 | 0.02 | −0.19 | 0.36 |
| −0.01 | A | −27.87 | 0.025 | 0.01 | −0.01 | 0.01 |
| 0.01 | A | 27.87 | 0.045 | 0.01 | −0.01 | 0.01 |
| 0.1 | A | 278.73 | 0.155 | 0.01 | −0.18 | 0.35 |
| 0.5 | A | 1393.87 | 0.605 | −0.01 | −4.50 | 8.90 |

TABLE 2

| $\Delta\alpha$[deg.] | Light beam | Lead regi. | Bow | Skew | Side regi. | Scanning width |
|---|---|---|---|---|---|---|
| V-type cylindrical mirror | | | | | | |
| −0.5 | B | −66.97 | 0.020 | 0 | 0.20 | −0.39 |
| −0.1 | B | −13.36 | 0.010 | 0 | 0.01 | −0.02 |
| −0.01 | B | −1.33 | 0.005 | 0.01 | 0 | 0 |
| 0.01 | B | 1.34 | 0 | 0 | 0 | 0 |
| 0.1 | B | 13.36 | 0 | 0 | 0.01 | −0.02 |
| 0.5 | B | 66.62 | −0.010 | 0 | 0.20 | −0.39 |
| Conventional cylindrical mirror | | | | | | |
| −0.5 | B | −1736.03 | −0.580 | 0.02 | −5.65 | 11.18 |
| −0.1 | B | −347.18 | −0.115 | 0.01 | −0.22 | 0.44 |
| −0.01 | B | −34.72 | −0.010 | 0 | 0 | 0 |
| 0.01 | B | 34.72 | 0.020 | 0 | 0 | 0 |
| 0.1 | B | 347.17 | 0.115 | −0.01 | −0.22 | 0.44 |
| 0.5 | B | 1736.10 | 0.580 | −0.02 | −5.65 | 11.19 |

TABLE 3

| $\Delta\alpha$[deg.] | Light beam | Lead regi. | Bow | Skew | Side regi. | Scanning width |
|---|---|---|---|---|---|---|
| V-type cylindrical mirror | | | | | | |
| −0.5 | C | −66.62 | 0.010 | 0 | 0.20 | −0.39 |
| −0.1 | C | −13.36 | 0 | 0 | 0.01 | −0.02 |
| −0.01 | C | −1.34 | 0 | 0 | 0 | 0 |
| 0.01 | C | 1.33 | −0.005 | −0.01 | 0 | 0 |
| 0.1 | C | 13.36 | −0.010 | 0 | 0.01 | −0.02 |
| 0.5 | C | 66.97 | −0.020 | 0 | 0.20 | −0.39 |
| Conventional cylindrical mirror | | | | | | |
| −0.5 | C | −1736.10 | −0.580 | 0.02 | −5.65 | 11.19 |
| −0.1 | C | −347.17 | −0.115 | 0.01 | −0.22 | 0.44 |
| −0.01 | C | −34.72 | −0.020 | 0 | 0 | 0 |
| 0.01 | C | 34.72 | 0.010 | 0 | 0 | 0 |
| 0.1 | C | 347.18 | 0.115 | −0.01 | −0.22 | 0.44 |
| 0.5 | C | 1736.03 | 0.580 | −0.02 | −5.65 | 11.18 |

TABLE 4

| $\Delta\alpha$[deg.] | Light beam | Lead regi. | Bow | Skew | Side regi. | Scanning width |
|---|---|---|---|---|---|---|
| V-type cylindrical mirror | | | | | | |
| −0.5 | D | −132.81 | −0.03 | −0.02 | 0.35 | −0.70 |
| −0.1 | D | −26.60 | −0.05 | −0.02 | 0.01 | −0.03 |
| −0.01 | D | −2.66 | −0.05 | −0.02 | 0 | 0 |
| 0.01 | D | 2.66 | −0.05 | −0.02 | 0 | 0 |
| 0.1 | D | 26.60 | −0.06 | −0.02 | 0.01 | −0.03 |
| 0.5 | D | 133.18 | −0.08 | −0.02 | 0.35 | −0.70 |

TABLE 4-continued

| Δα[deg.] | Light beam | Lead regi. | Bow | Skew | Side regi. | Scanning width |
|---|---|---|---|---|---|---|
| Conventional cylindrical mirror | | | | | | |
| −0.5 | D | −1393.87 | −0.605 | 0.01 | −4.50 | 8.90 |
| −0.1 | D | −278.73 | −0.155 | −0.01 | −0.18 | 0.35 |
| −0.01 | D | −27.87 | −0.045 | −0.01 | −0.01 | 0.01 |
| 0.01 | D | 27.87 | −0.025 | −0.01 | −0.01 | 0.01 |
| 0.1 | D | 278.72 | 0.080 | −0.02 | −0.19 | 0.36 |
| 0.5 | D | 1393.64 | 0.540 | −0.04 | −4.51 | 8.92 |

As shown in Tables 1 to 4, especially paying attention to the lead regi. which varies largely to cause a problem, in the case of the V-type cylindrical mirror of the embodiment, it is held down to about 1/25 to 1/10 as large as that in the case of the conventional cylindrical mirror.

Tables 5 to 9 show the calculation results of variations in lead regi., bow, skew, side regi. and scanning width between the light beams in the first embodiment in comparison with those in the conventional cylindrical mirror.

TABLE 5

Lead regi.

| Δα[deg.] | A to B | A to C | A to D | B to C | Maximum Value (Absolute Value) |
|---|---|---|---|---|---|
| V-type cylindrical mirror | | | | | |
| −0.5 | −66.21 | −66.56 | −0.37 | −0.35 | 66.56 |
| −0.1 | −13.24 | −13.24 | 0 | 0 | 13.24 |
| −0.01 | −1.33 | −1.32 | 0 | 0.01 | 1.33 |
| 0.01 | 1.32 | 1.33 | 0 | 0.01 | 1.33 |
| 0.1 | 13.24 | 13.24 | 0 | 0 | 13.24 |
| 0.5 | 66.19 | 65.84 | −0.37 | −0.35 | 66.19 |
| Ordinary cylindrical mirror | | | | | |
| −0.5 | 342.39 | 342.46 | 0.23 | 0.07 | 342.46 |
| −0.1 | 68.46 | 68.45 | 0.01 | −0.01 | 68.46 |
| −0.01 | 6.85 | 6.85 | 0 | 0 | 6.85 |
| 0.01 | −6.85 | −6.85 | 0 | 0 | 6.85 |
| 0.1 | −68.44 | −68.45 | 0.01 | −0.01 | 68.45 |
| 0.5 | −342.23 | −342.16 | 0.23 | 0.07 | 342.23 |

TABLE 6

Bow

| Δα[deg.] | A to B | A to C | A to D | B to C | Maximum Value (Absolute Value) |
|---|---|---|---|---|---|
| V-type cylindrical mirror | | | | | |
| −0.5 | 0.06 | 0.07 | 0.11 | 0.01 | 0.11 |
| −0.1 | 0.05 | 0.06 | 0.11 | 0.01 | 0.11 |
| −0.01 | 0.045 | 0.05 | 0.1 | 0.005 | 0.1 |
| 0.01 | 0.05 | 0.055 | 0.1 | 0.005 | 0.1 |
| 0.1 | 0.05 | 0.06 | 0.11 | 0.01 | 0.11 |
| 0.5 | 0.04 | 0.05 | 0.11 | 0.01 | 0.11 |
| Ordinary cylindrical mirror | | | | | |
| −0.5 | 0.04 | 0.04 | 0.065 | 0 | 0.065 |
| −0.1 | 0.035 | 0.035 | 0.075 | 0 | 0.075 |
| −0.01 | 0.035 | 0.045 | 0.07 | 0.01 | 0.07 |
| 0.01 | 0.025 | 0.035 | 0.07 | 0.01 | 0.07 |
| 0.1 | 0.04 | 0.04 | 0.075 | 0 | 0.075 |
| 0.5 | 0.025 | 0.025 | 0.065 | 0 | 0.065 |

TABLE 7

Skew

| Δα[deg.] | A to B | A to C | A to D | B to C | Maximum Value (Absolute Value) |
|---|---|---|---|---|---|
| V-type cylindrical mirror | | | | | |
| −0.5 | 0.02 | 0.02 | 0.04 | 0 | 0.04 |
| −0.1 | 0.02 | 0.02 | 0.04 | 0 | 0.04 |
| −0.01 | 0.01 | 0.02 | 0.04 | 0.01 | 0.04 |
| 0.01 | 0.02 | 0.03 | 0.04 | 0.01 | 0.04 |
| 0.1 | 0.02 | 0.02 | 0.04 | 0 | 0.04 |
| 0.5 | 0.02 | 0.02 | 0.04 | 0 | 0.04 |
| Ordinary cylindrical mirror | | | | | |
| −0.5 | 0.02 | 0.02 | 0.03 | −2.2E-13 | 0.03 |
| −0.1 | 0.01 | 0.01 | 0.03 | 0 | 0.03 |
| −0.01 | 0.01 | 0.01 | 0.02 | 0 | 0.02 |
| 0.01 | 0.01 | 0.01 | 0.02 | 0 | 0.02 |
| 0.1 | 0.02 | 0.02 | 0.03 | 0 | 0.03 |
| 0.5 | 0.01 | 0.01 | 0.03 | −2.2E-13 | 0.03 |

TABLE 8

Side regi.

| Δα[deg.] | A to B | A to C | A to D | B to C | Maximum Value (Absolute Value) |
|---|---|---|---|---|---|
| V-type cylindrical mirror | | | | | |
| −0.5 | 0.15 | 0.15 | 0 | 0 | 0.15 |
| −0.1 | 0 | 0 | 0 | 0 | 0 |
| −0.01 | 0 | 0 | 0 | 0 | 0 |
| 0.01 | 0 | 0 | 0 | 0 | 0 |
| 0.1 | 0 | 0 | 0 | 0 | 0 |
| 0.5 | 0.15 | 0.15 | 0 | 0 | 0.15 |
| Ordinary cylindrical mirror | | | | | |
| −0.5 | 1.14 | 1.14 | −0.01 | 0 | 1.14 |
| −0.1 | 0.03 | 0.03 | −0.01 | 0 | 0.03 |
| −0.01 | −0.01 | −0.01 | 0 | 0 | 0.01 |
| 0.01 | −0.01 | −0.01 | 0 | 0 | 0.01 |
| 0.1 | 0.04 | 0.04 | 0.01 | 0 | 0.04 |
| 0.5 | 1.15 | 1.15 | 0.01 | 0 | 1.15 |

TABLE 9

Scanning width

| Δα[deg.] | A to B | A to C | A to D | B to C | Maximum Value (Absolute Value) |
|---|---|---|---|---|---|
| V-type cylindrical mirror | | | | | |
| −0.5 | −0.31 | −0.31 | 0 | 0 | 0.31 |
| −0.1 | −0.01 | −0.01 | 0 | 0 | 0.01 |
| −0.01 | 0 | 0 | 0 | 0 | 0 |
| 0.01 | 0 | 0 | 0 | 0 | 0 |
| 0.1 | −0.01 | −0.01 | 0 | 0 | 0.01 |
| 0.5 | −0.31 | −0.31 | 0 | 0 | 0.31 |
| Ordinary cylindrical mirror | | | | | |
| −0.5 | −2.26 | −2.27 | 0.02 | −0.01 | 2.27 |
| −0.1 | −0.08 | −0.08 | 0.01 | 0 | 0.08 |
| −0.01 | 0.01 | 0.01 | 0 | 0 | 0.01 |
| 0.01 | 0.01 | 0.01 | 0 | 0 | 0.01 |
| 0.1 | −0.09 | −0.09 | −0.01 | 0 | 0.09 |
| 0.5 | −2.29 | −2.28 | −0.02 | 0.01 | 2.29 |

The numerical value in the tables show variations in color aberration of a finally formed color image. Since these variations are substantially symmetrical about the center line drawn between the light beams B and C, the tables respectively show the differences in variation only between A and B, between A and C, between A and D and between B and C. But in the case of difference between B and D, for example, it is safe to say that though the signs are different the absolute value of variation is substantially equal to the difference between A and C.

From the tables 5 to 9, it is found that in the case of using the V-type cylindrical mirror of the embodiment, color aberration in the direction of lead registration is reduced to about ⅕ as much as that in the conventional ordinary cylindrical mirror. Concerning the other items, the color aberration in the case of the V-type cylindrical mirror of the embodiment is small. Although it is increased only in the bow, this is originally a very small variation, so it does not matter.

A second embodiment of the present invention will now be described.

In calculation in the first embodiment, as shown in FIG. 5, the description deals with an example in which the cylindrical mirror 32_2 having a concave mirror surface is disposed on the upstream side of the optical path of a light beam, and the plane mirror 32_1 is disposed on the downstream side of the optical path to construct the reflecting member 33, but the converse arrangement may also be done, that is, it is possible to dispose the plane mirror 32_1 on the upstream side of the optical path of a light beam and the cylindrical mirror 32_2 having a concave mirror surface on the downstream side of the optical path, and it has become clear that the reflecting member 33 thus constructed will reduce color aberration.

Tables 10 to 14 show the calculation results of variations in lead registration, bow, skew, side registration and scanning width between light beams in the second embodiment.

TABLE 10

Lead regi.

| Δα[deg.] | A to B | A to C | A to D | B to C | Maximum Value (Absolute Value) |
|---|---|---|---|---|---|
| V-type cylindrical mirror | | | | | |
| −0.5 | −6.01 | −4.02 | 2.69 | 1.99 | 6.01 |
| −0.1 | −0.96 | −1.06 | 0.53 | −0.1 | 1.06 |
| −0.01 | 0.15 | −0.04 | 0.37 | −0.19 | 0.37 |
| 0.01 | 0.39 | 0.2 | 0.35 | −0.19 | 0.39 |
| 0.1 | 1.48 | 1.38 | 0.34 | −0.1 | 1.48 |
| 0.5 | 6.21 | 8.2 | 1.71 | 1.99 | 8.2 |

TABLE 11

Bow

| Δα[deg.] | A to B | A to C | A to D | B to C | Maximum Value (Absolute Value) |
|---|---|---|---|---|---|
| V-type cylindrical mirror | | | | | |
| −0.5 | 0.09 | 0.1 | 0.09 | 0.01 | 0.1 |
| −0.1 | 0.05 | 0.05 | 0.08 | 1.73E-15 | 0.08 |
| −0.01 | 0.05 | 0.05 | 0.09 | 0 | 0.09 |
| 0.01 | 0.04 | 0.04 | 0.08 | 0 | 0.08 |
| 0.1 | 0.03 | 0.03 | 0.085 | 1.73E-15 | 0.085 |
| 0.5 | −0.01 | 3.47E-15 | 0.085 | 0.01 | 0.085 |

TABLE 12

Skew

| Δα[deg.] | A to B | A to C | A to D | B to C | Maximum Value (Absolute Value) |
|---|---|---|---|---|---|
| V-type cylindrical mirror | | | | | |
| −0.5 | 0.02 | 0.02 | 0.04 | 0 | 0.04 |
| −0.1 | 0.02 | 0.02 | 0.04 | 0 | 0.04 |
| −0.01 | 0.02 | 0.02 | 0.04 | 0 | 0.04 |
| 0.01 | 0.02 | 0.02 | 0.04 | 0 | 0.04 |
| 0.1 | 0.02 | 0.02 | 0.03 | 0 | 0.03 |
| 0.5 | 0.02 | 0.02 | 0.03 | 0 | 0.03 |

TABLE 13

Side regi.

| Δα[deg.] | A to B | A to C | A to D | B to C | Maximum Value (Absolute Value) |
|---|---|---|---|---|---|
| V-type cylindrical mirror | | | | | |
| −0.5 | 0.13 | 0.13 | 0 | 0 | 0.13 |
| −0.1 | 0 | 0 | 0 | 0 | 0 |
| −0.01 | 0 | 0 | 0 | 0 | 0 |
| 0.01 | 0 | 0 | 0 | 0 | 0 |
| 0.1 | 0 | 0 | 0 | 0 | 0 |
| 0.5 | 0.13 | 0.13 | 0 | 0 | 0.13 |

TABLE 14

Scanning width

| Δα[deg.] | A to B | A to C | A to D | B to C | Maximum Value (Absolute Value) |
|---|---|---|---|---|---|
| V-type cylindrical mirror | | | | | |
| −0.5 | −0.27 | −0.26 | 0 | 0.01 | 0.27 |
| −0.1 | −0.01 | −0.01 | −0.01 | 0 | 0.01 |
| −0.01 | 0 | 0 | 0 | 0 | 0 |
| 0.01 | 0 | 0 | 0 | 0 | 0 |
| 0.1 | 0 | 0 | 0.01 | 0 | 0.01 |
| 0.5 | −0.26 | −0.27 | 0 | −0.01 | 0.27 |

As shown in Table 10 to 14, in the case where the plane mirror is disposed on the upstream side of the optical path of a light beam and the cylindrical mirror is disposed on the downstream side, shifting of the image formation position is smaller than that in the first embodiment.

Figure 6:
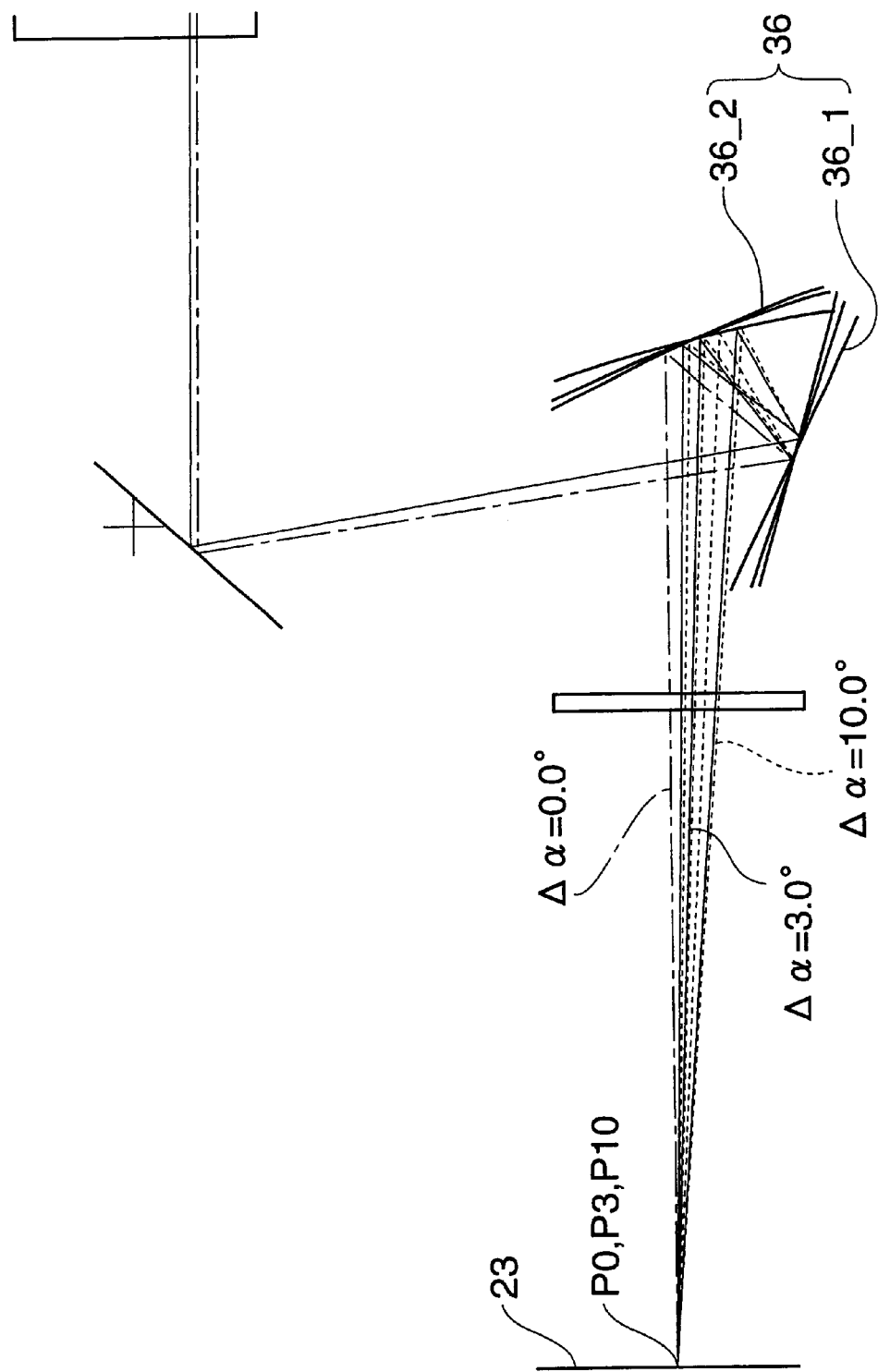
FIG. 6 is a diagram showing the condition of optical path change in a second embodiment of the beam corresponding optical system.

FIG. 6 is a diagram showing the condition of change of the optical path in a beam corresponding optical system in the second embodiment.

As shown in FIG. 6, with a reflecting member 36 having a plane mirror 36_1 on the upstream side of the optical path of a light beam and a cylindrical mirror 36_2 on the downstream, the change of the optical path depending on the angle change of the reflecting member 36 is different from the optical path change in the reflecting member 32 in the first embodiment shown in FIG. 5, and the image formation positions P0, P3, P10 substantially agree with the image formation position P0 at an angle Δα=0.0°, so that color aberration can be remarkably improved. The reasons will now be described with reference to FIGS. 7 and 8.

Figure 7:
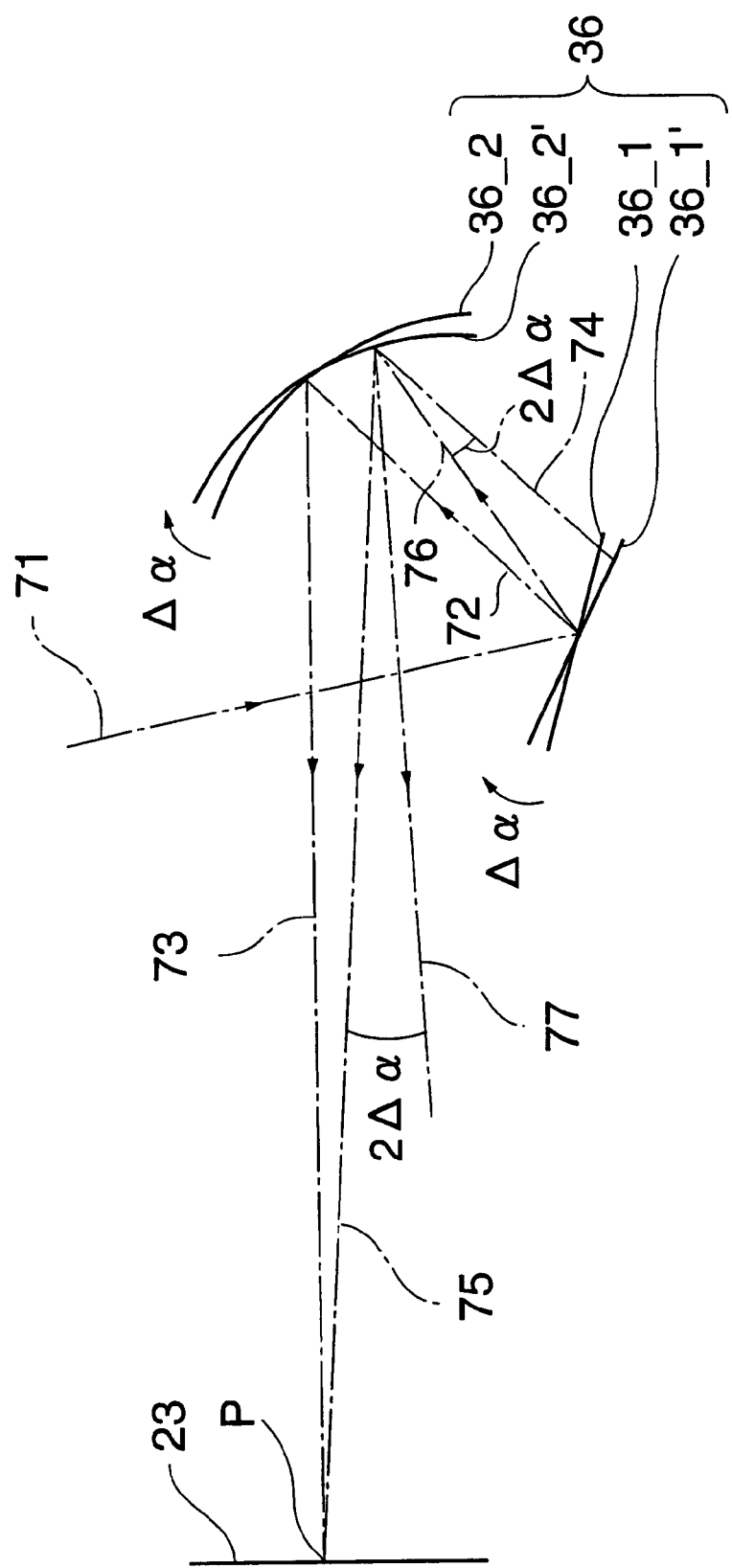
FIG. 7 is an illustrative diagram showing the optical path change depending on the change of angle of the beam corresponding optical system in the second embodiment.
Figure 8:
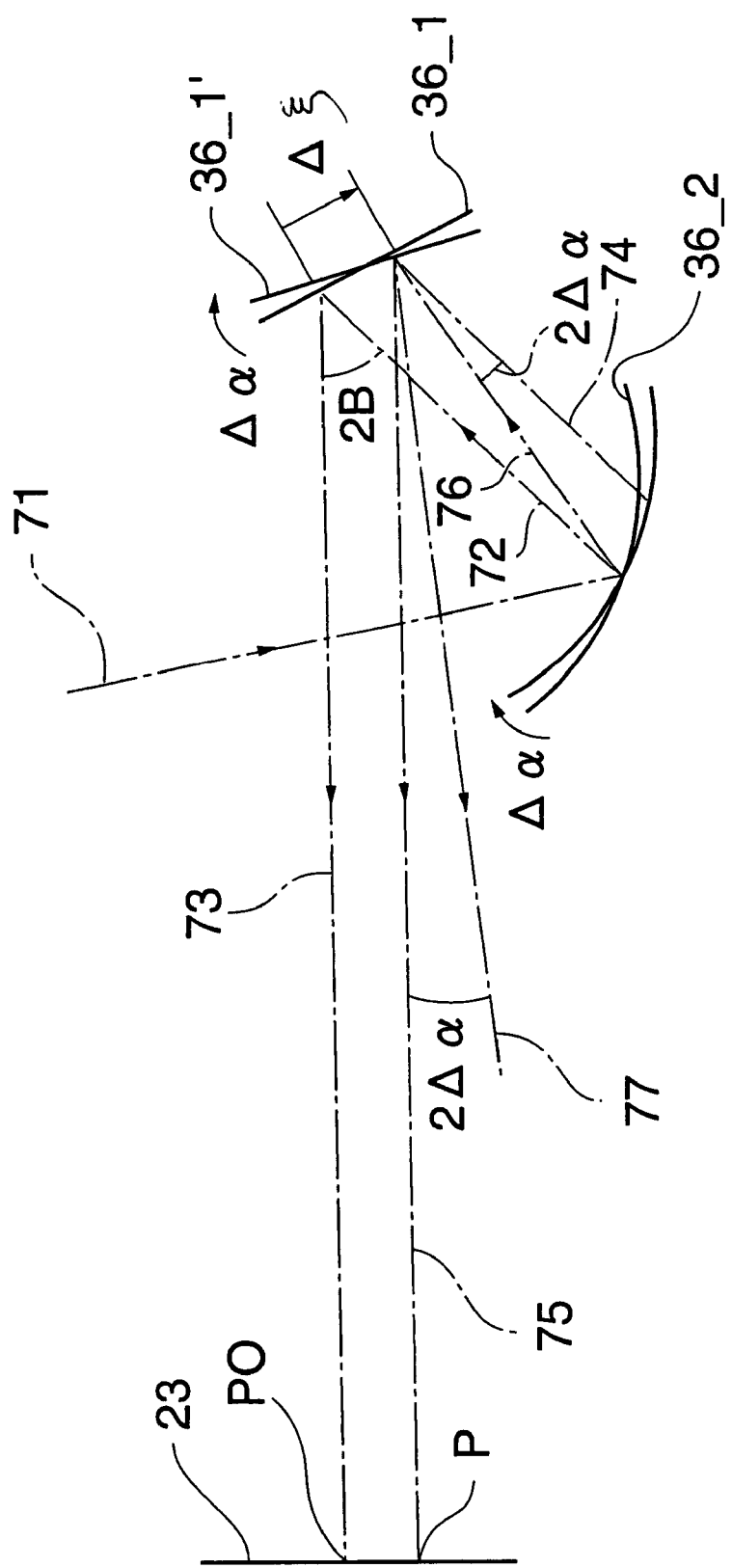
FIG. 8 is an illustrative diagram showing the optical path change depending on the change of angle of the beam corresponding optical system in the first embodiment.

FIG. 7 is an illustrative diagram showing the change of the optical path depending on the angle change of the beam corresponding optical system in the second embodiment, and FIG. 8 is an illustrative diagram showing the change of the optical path depending on the angle change of the beam corresponding optical system in the first embodiment. The reference numerals 71 to 77 show the optical path of the light beam and the light beam itself, and among them, the reference numeral 74 is an auxiliary line drawn for explaining a virtual light beam. On the optical system in which plural light beams adjacent to each other are separated by the separating polygon mirror 31 (See FIG. 1) and the separated light beams are converged by the beam corresponding optical systems 22a, 22b, 22c, 22d like the beam corresponding optical system used in the optical scanning device of the present invention, the following two limitations are placed:

(1) Adjacent light beams should not overlap each other on the separating polygon mirror 31; and
(2) The respective beam corresponding optical systems should be arranged near the scanned surfaces as much as possible to reduce the beam diameter on each scanned surface.

According to the two limitations, the degree of freedom of position of the beam corresponding optical system in the optical system after the polygon mirror 29 is not so high, and it is arranged in a position near the scanned surface as compared with the general optical scanning device.

According to the limitation (1), it is difficult to expand the light beam in the slow-scanning direction by the fθ lens 30, so that the light beam 71 entering the reflecting member 36 (See FIG. 7) is far closer to a parallel pencil of rays as compared with the convergent light to the scanned surface 23. By the function of the cylindrical mirror 36_2, the light beam 72 reflected by the plane mirror 36_1 before the angle change is reflected by the cylindrical mirror 36_2 and imaged on the image formation position P on the scanned surface through the optical path 73, and the virtual light beam 74 parallel to the light beam 72 is reflected by the cylindrical mirror 36_2 and imaged on the substantially same image formation position as the image formation position P on the scanned surface 23 through the optical path 75.

When the plane mirror 36_1 is rotated clockwise by an angle Δα here, supposing that the cylindrical mirror 36_2 makes no angle change, the light beam 76 reflected by the plane mirror 36_1' after angle change travels through the optical path 77 shifted counter-clockwise from the optical path 75 by an angle 2Δα. However, in the reflecting member 36 of the embodiment, the plane mirror 36_1 and the cylindrical mirror 36_2 are constructed to integrally make an angle change, so that the cylindrical mirror 36_2 is also rotated clockwise by an angle Δα. The angle change of Δα of the cylindrical mirror 36_2 works to again pull back the light beam which is to travel through the optical path 77 if there is no such angle change to the optical path 75. Since the light beam 71 incident on the reflecting member 36 is not a complete parallel pencil of rays and the point of reflection of the virtual light beam 74 by the cylindrical mirror 36_2 and the point of reflection of the light beam 76 by the cylindrical mirror 36_2' do not exactly agree with each other, it cannot be pulled back to the optical path completely aligned with the optical path 75, but the difference is small.

On the other hand, as shown in FIG. 8, in the case where the cylindrical mirror 36_2 is arranged on the upstream side of the optical path of the light beam, the optical path 75 of reflected light at the time of rotating the cylindrical mirror 36_2 clockwise by an angle Δα is parallel to the emitting direction of the optical path 73 before rotation of the cylindrical mirror 36_2, but since the point of reflection on the plane mirror 36_1 is shifted by Δξ, the image formation position P on the scanned surface 23 is shifted from the image formation position P0 before rotation by Δξ cos B. Therefore, the "pull-back-optical-path effect" in the case of arranging the cylindrical mirror 36_2 on the downstream side of the optical path cannot be obtained.

As described above, in the case where the cylindrical mirror is arranged on the downstream side of the optical path of the light beam from the plane mirror, the change of image formation position on the scanned surface depending on the angle change can be further reduced as compared with the case of arranging the plane mirror on the downstream side of the optical path of the light beam from the cylindrical mirror.

Further, a third embodiment of the present invention will now be described.

Figure 12:
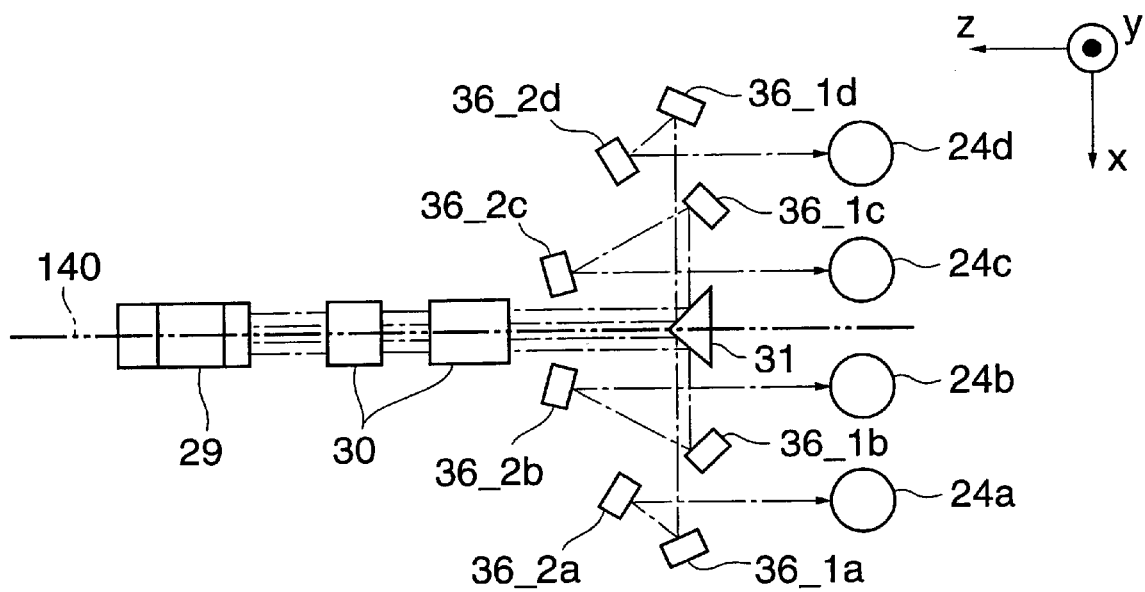
FIG. 12 is a schematic block diagram showing a third embodiment of an optical scanning device, which illustrates the definition of a coordinate system.
Figure 13:
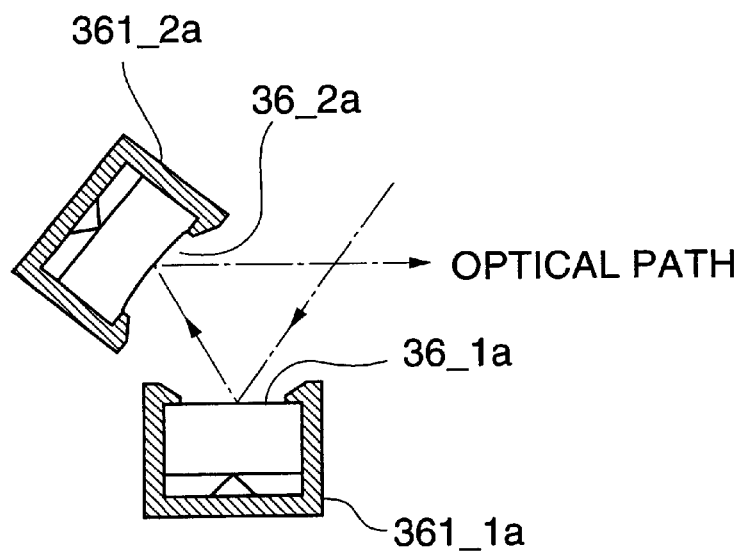
FIG. 13 is a diagram showing the condition where two mirrors are respectively held by separate holding members.

Though the preceding embodiment, as shown in FIG. 2, deals with the example in which two mirrors constituting the beam corresponding optical system are substantially integrally formed, it is not always necessary to integrally form two mirrors, and as described in the following, even if the mirrors are independently supported, the same effect can be expected. Such situations will occur in the following case. As shown in FIG. 12, the separating polygon mirror 31 is so constructed that a two-plane mirror with the apex angle of about 90 degrees is provided to separate four light beams into two beams each, and further as typically a plane mirror 36_1a held on a holding member 361_1a and a cylindrical mirror 36_2a held on a holding member 361_2a separate from the holding member 361_1a are shown in FIG. 13, the separated beams are imaged on the photoreceptor drums 24a to 24d by the independently supported plane mirrors 36_1a to 36_1d and the cylindrical mirrors 36_2a to 36_2d. The reason why the two-plane mirror is used as the separating polygon mirror is that the cost of making the separating polygon mirror is reduced; provided that, as shown in FIG. 12, preferably the mirror is arranged to keep the optical path between two mirrors from intersecting the optical axis 140 (plane where the optical path of the light beam reflected by the polygon mirror 29 passes) of the light beam reflected by the polygon mirror 29 to reach the separating polygon mirror 31. If the condition is not satisfied, under a certain condition, a very large change of image formation position, in its turn color aberration is caused. The reason will now be described.

Figure 14C:
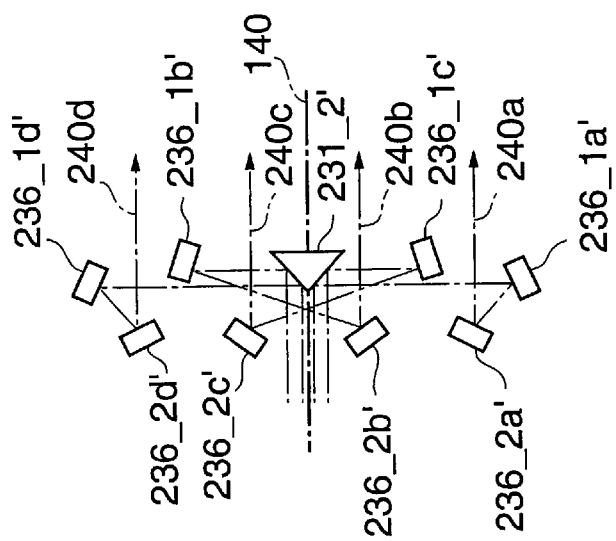
FIG. 14 is a diagram illustrating a difference among the conventional optical scanning device, a third embodiment of an optical scanning device and an optical scanning device in which the optical path between two mirrors of the beam corresponding optical system intersects the optical axis.
Figure 14B:
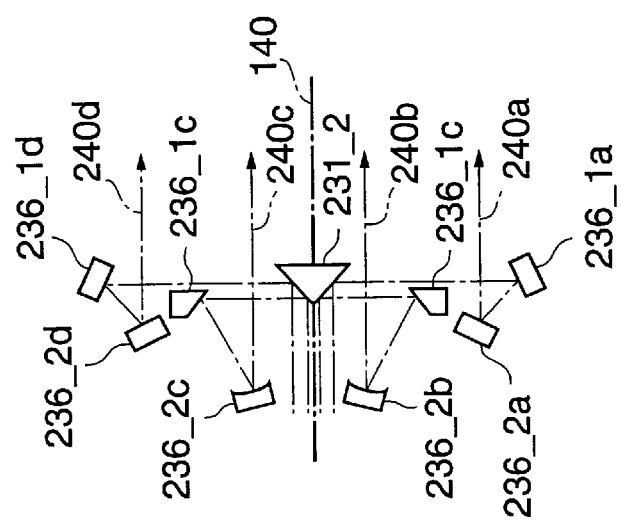
Figure 14A:
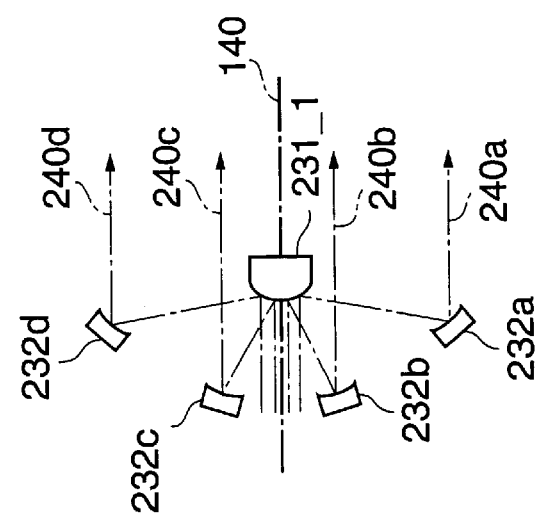

As already described, among the changes in position and orientation of the cylindrical mirror, it is the angle change taking the fast-scanning direction as the axis of rotation that has great influence on color aberration. As the cause of angle change, always considered is the temperature change of the whole apparatus. The actual deformation of an enclosure is influenced by the shape and material quality of the enclosure, the temperature distribution and an air current, very complicated and accurate estimation is difficult, so only the highly simplified deformation is considered here. The temperature change which causes the angle change taking the fast-scanning direction as the axis of rotation introducing a problem is such that in the coordinate system defined in FIG. 12, there is a temperature gradient in the directions of x-axis (vertical) and z-axis (longitudinal). For comparison, three types of optical paths shown in FIG. 14 are examined. In FIG. 14, the type I is the conventional type such that the light beams reflected by a separating polygon mirror 231_1 are reflected once by cylindrical mirrors 232a to 232d to be guided to the image surface, the type II is the same type as shown in FIG. 12, which corresponds to this embodiment, and the type III is the type such that the optical path between two mirrors 236_1a' to 236_1d', 236_2a' to 236_2d' constituting the beam corresponding optical system intersects the optical axis 140.

Figure 15:
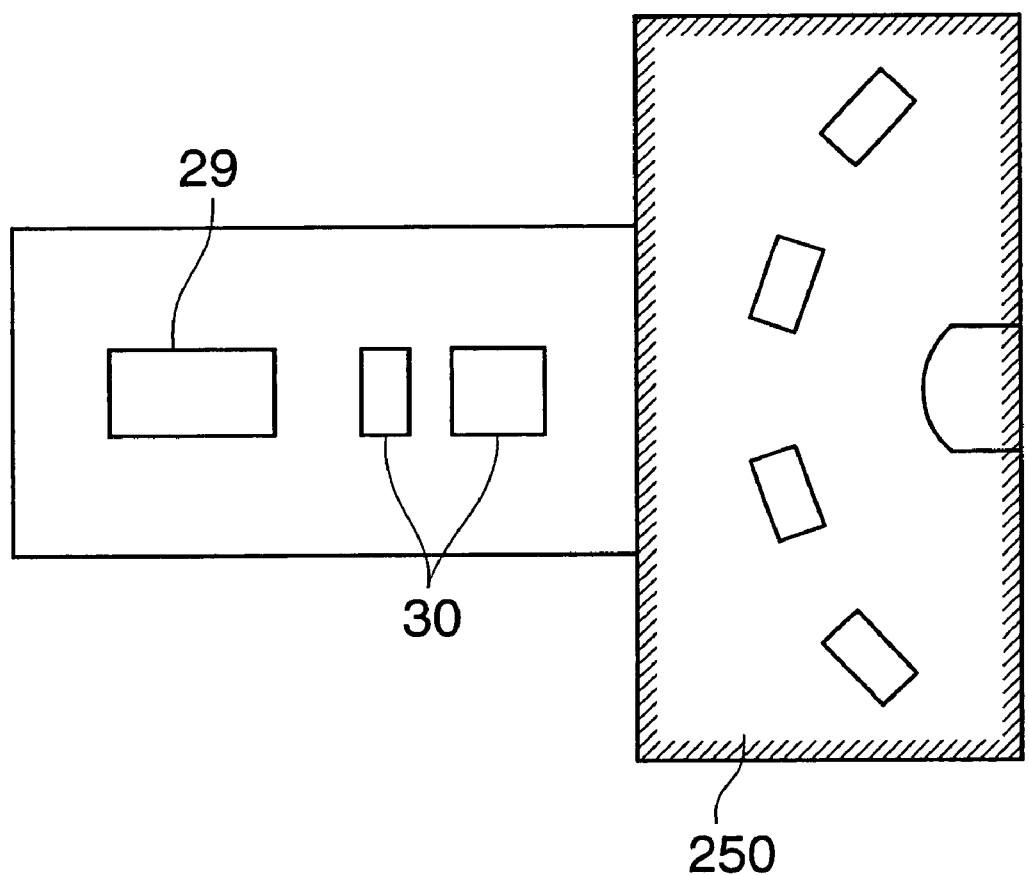
FIG. 15 is a diagram for defining the region of a separation area.
Figure 16A:
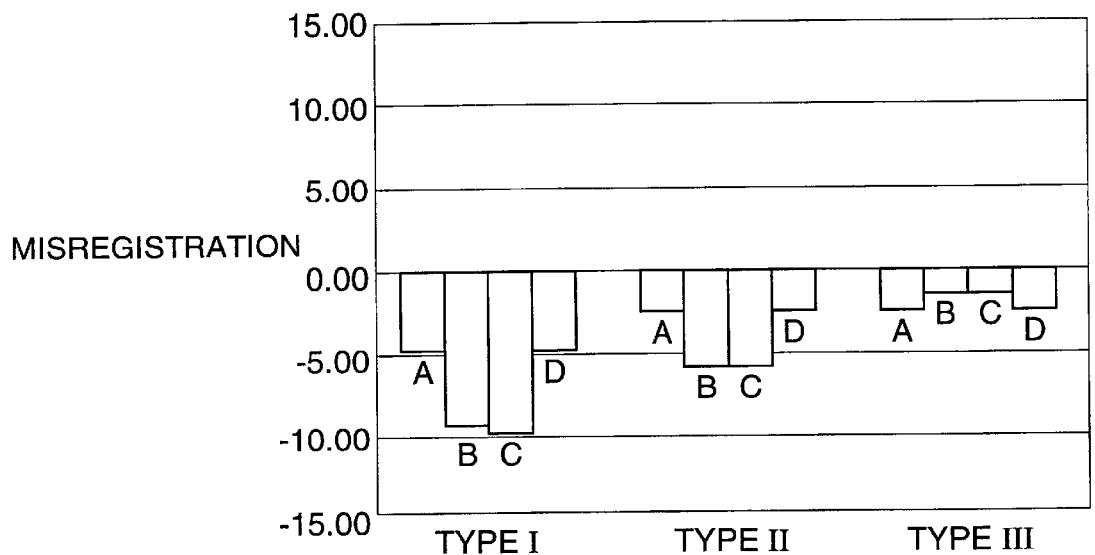
FIG. 16 is a diagram showing misregistration at the time of a temperature change in three types of optical scanning devices shown in FIG. 14.
Figure 16B:
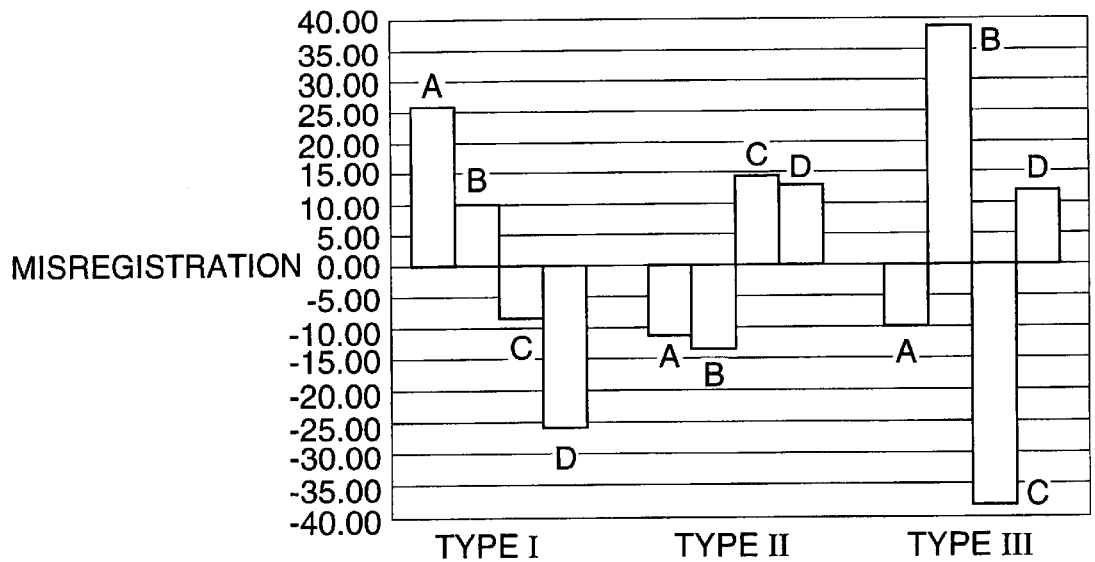

Now, it is supposed that the deformation of a portion 250 (a hatching part of FIG. 15. Hereinafter referred to as separation area) contributing the change in position and orientation of the cylindrical mirror being considered, there is an ideal linear temperature gradient in two directions of x-axis and y-axis. The calculation results of the change of lead registration of the respective beams 240a to 240d at this time are shown in FIG. 16 and the maximum color aberration is shown in Table 15. The temperature gradient in the direction of x-axis is such that the temperature is higher at the lower part, and the temperature gradient in the direction of z-axis is such that the temperature is higher on the image surface side. The temperature difference between the ends of the separation areas in the direction of temperature gradient is taken to be 10° C.

TABLE 15

| Direction of temperature gradient | Type I | Type II | Type III |
| --- | --- | --- | --- |
| X-axis (vertical) | 5.03 μm | 3.25 μm | 1.20 μm |
| Z-axis (longitudinal) | 51.64 μm | 27.92 μm | 76.80 μm |

From FIG. 16 and the Table 15, it is found that the absolute value of color aberration amount in the case of the temperature gradient in the direction of x-axis is far smaller than that in the case of the temperature gradient in the direction of z-axis, which does not matter, and the absolute value of lead registration in the case of temperature gradient in the direction of z-axis is so large that it exerts great influence on the image quality though the temperature change amount is the same. The color aberration in the type II which is the embodiment is held down to the minimum.

The reason why the misregistration is comparatively small in the type II which is this embodiment is that although plane mirrors 236-1a to 236-1d and cylindrical mirrors 236- 2a to 236-2d are independently supported, the optical path is similar to that in the case of using the V-type cylindrical mirror in the preceding embodiment, so that even if an enclosure is deformed, two mirrors constituting the beam corresponding optical system are rotated in the same direction to restrain misregistration.

Figure 17:
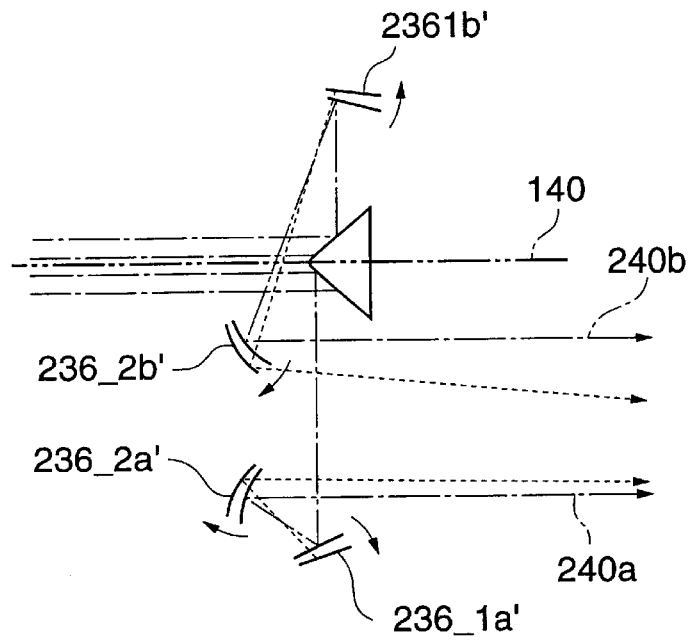
FIG. 17 is a diagram for explaining the cause for the occurrence of great misregistration in the optical scanning device in which the optical path between two mirrors of the beam corresponding optical system intersects the optical axis.

The reason of causing a great misregistration when there is a temperature gradient in the direction of z-axis in the case where the optical path between two mirrors 236_1a' to 236_1d', 236_2a' to 236_2d' intersects the optical axis 140 will be described with reference to FIG. 17. Though only two of four light beams are shown for description in FIG. 17, the same discussion is with the remaining two light beams. So they are omitted. When there is such a temperature gradient in the direction of z-axis that the temperature on the image surface side (right side in FIG. 17) is higher, the x-axis direction on the image surface side is relatively extended so that the respective mirrors are rotated as indicated by arrows. The rotating directions are substantially symmetrical about the optical axis. As to the plane mirror 236_1a' and the cylindrical mirror 236_2a', since both of the two mirrors are rotated in the same direction, the misregistration can be held down smaller by the same effect as that of the V-type cylindrical mirror. However, as the mirrors 236_1b' and 236 2b' have the optical axis 140 sandwiched between them, the rotating directions are reverse. Therefore, deflection of the light beam by the rotation of the plane mirror 236_1b' is further increased by the cylindrical mirror 236_2b', so that the misregistration of the light beam 240b and further the light beam 240c symmetrical thereto are increased.

From the description, it is known that two mirrors constituting the beam corresponding optical system are arranged on the same side, seen from the optical axis 140, that is, the optical path between two mirrors is kept from intersecting the optical axis, thereby obtaining the misregistration reducing effect similar to that of the V-type cylindrical mirror, and if the condition is not satisfied, the image quality is worsened in some cases.

Figure 18A:
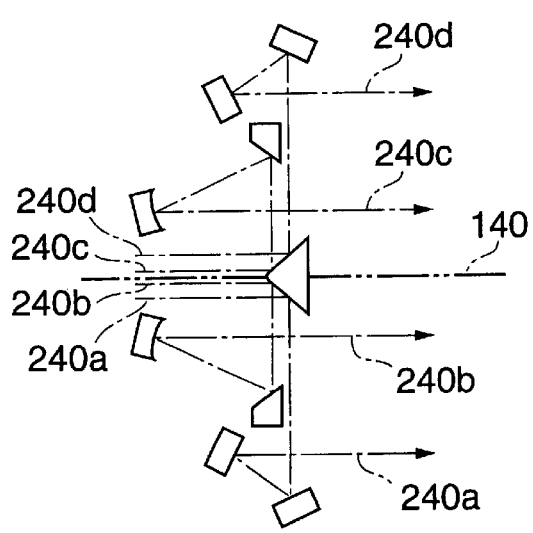
FIG. 18 is a diagram for explaining two kinds of optical paths available in a third embodiment of the optical scanning device.
Figure 18B:
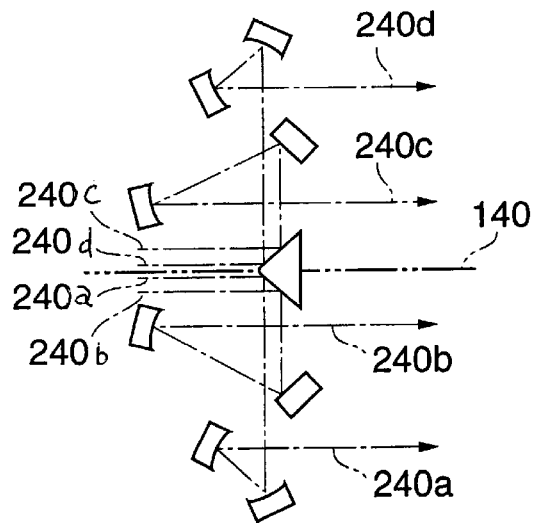

In the third embodiment of the present invention, there are two kinds of ways of setting the optical system depending on which two of parallel light beams each separated by the separating polygon mirror 31 are guided to the outside photoreceptor drums 24a and 24d. The condition is shown in FIG. 18. In FIG. 18, the light beams irradiating the photoreceptor drums 24a to 24d are simply indicated in order by the reference numerals 240a to 240d. The order of arranging the light beams before entering the separating polygon mirror 31 is the same as the order of arranging the photoreceptor drums in FIG. 18A, 240a, 240b, 240c, 240d in order from the bottom in the drawing, and in FIG. 18B, 240b, 240a, 240d, 240c in order. In this embodiment, the optical system of the optical scanning device is a focal, so that the smaller the beam diameter in the slow-scanning direction on the photoreceptor drums 24a to 24d, the smaller is the distance between the cylindrical mirror and the photoreceptor drum surface. Accordingly, in the embodiment shown in FIG. 18, in either case, the beam diameter in the slow-scanning direction on the outside photoreceptor drums 24a, 24d is smaller than the beam diameter in the slow-scanning direction on the inside photoreceptor drums 24b, 24c.

The variation in the beam diameter in the slow-scanning direction causes a difference in the area covering rate by each color in an output image. This is not favorable in image quality. Since it is not easy to reduce the beam diameter in the slow-scanning direction on the inside photoreceptor drums 24b, 24c, the following description deals with the measure of enlarging the beam diameter in the slow-scanning direction on the outside photoreceptor drums 24a, 24d.

Figure 19A:
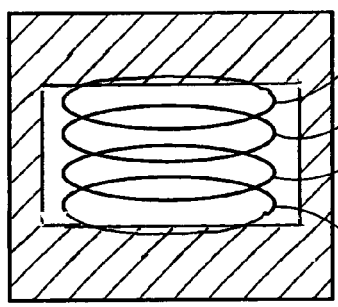
FIG. 19 is a diagram showing the shape of an aperture for adjusting the beam diameter.

In the general image formation optical system, to enlarge the beam diameter, it will be sufficient to reduce the aperture diameter to enhance spreading of diffracted light. Accordingly, in the case like FIG. 18A, as the beams imaged on the outside photoreceptor drums 24a, 24d are on the outside before separation, it will be sufficient to dispose an aperture 237 shielding some of the outside in the slow-scanning direction of the outside light beams 240a, 240b in the midway of the optical path as shown in FIG. 19A. As it is difficult to dispose an aperture elongated in the scanning direction with good accuracy after being deflected and scanned by the polygon mirror 29, it is desirable to dispose the aperture before deflection, that is, after the light beam passes through the collimator lens 26 and a diaphragm, and also in front of the polygon mirror 29. In FIG. 19A, it is supposed that the aperture is disposed in the optical path after passing the cylindrical lens 27, so each light beam is elongated in the fast-scanning direction to be substantially elliptical. This type, however, has the disadvantage that though the aperture can be easily manufactured, the mirrors 236_1a to d are trapezoidal in the section as shown in FIG. 18 so that the manufacture is difficult.

Figure 19B:
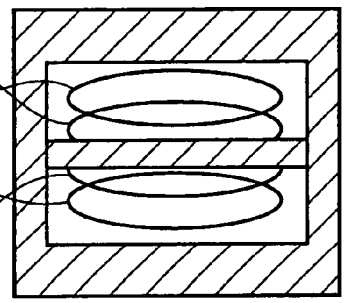

Further, in the case where the light beams which are inside before separation are guided to the outside photoreceptor drums 24a, 24d as shown in FIG. 18B, the beam diameter can be increased by shielding only the central part before separation or by partially shielding only the light beams going toward the photoreceptors 24a, 24d after separation. Similarly to the case of FIG. 18A, also in this case, desirably the ends of light beams 240b, 240c are partially shielded by a rectangular shielding member elongated in the fast-scanning direction before deflection as shown in FIG. 19B, thereby disposing the aperture with good accuracy. In this case, good-accuracy manufacture and arrangement of the aperture having a shielding unit as shown in FIG. 19B become a little complicated than in the case of FIG. 18A. The shapes of mirrors 236_1a to 236_1d, however, have no specificity, and the increase in cost of manufacturing the mirrors can be prevented. As the shielding member, a filter having a rectangular low transmittance part in the center may be used.

Table 16 shows the calculation results of the beam diameter in the slow-scanning direction in the cases of FIG. 18A and 18B when the aperture shown in FIG. 19 is used. It is found that in either case, the beam diameters in the slow-scanning direction can be made substantially uniform.

Figure 20:
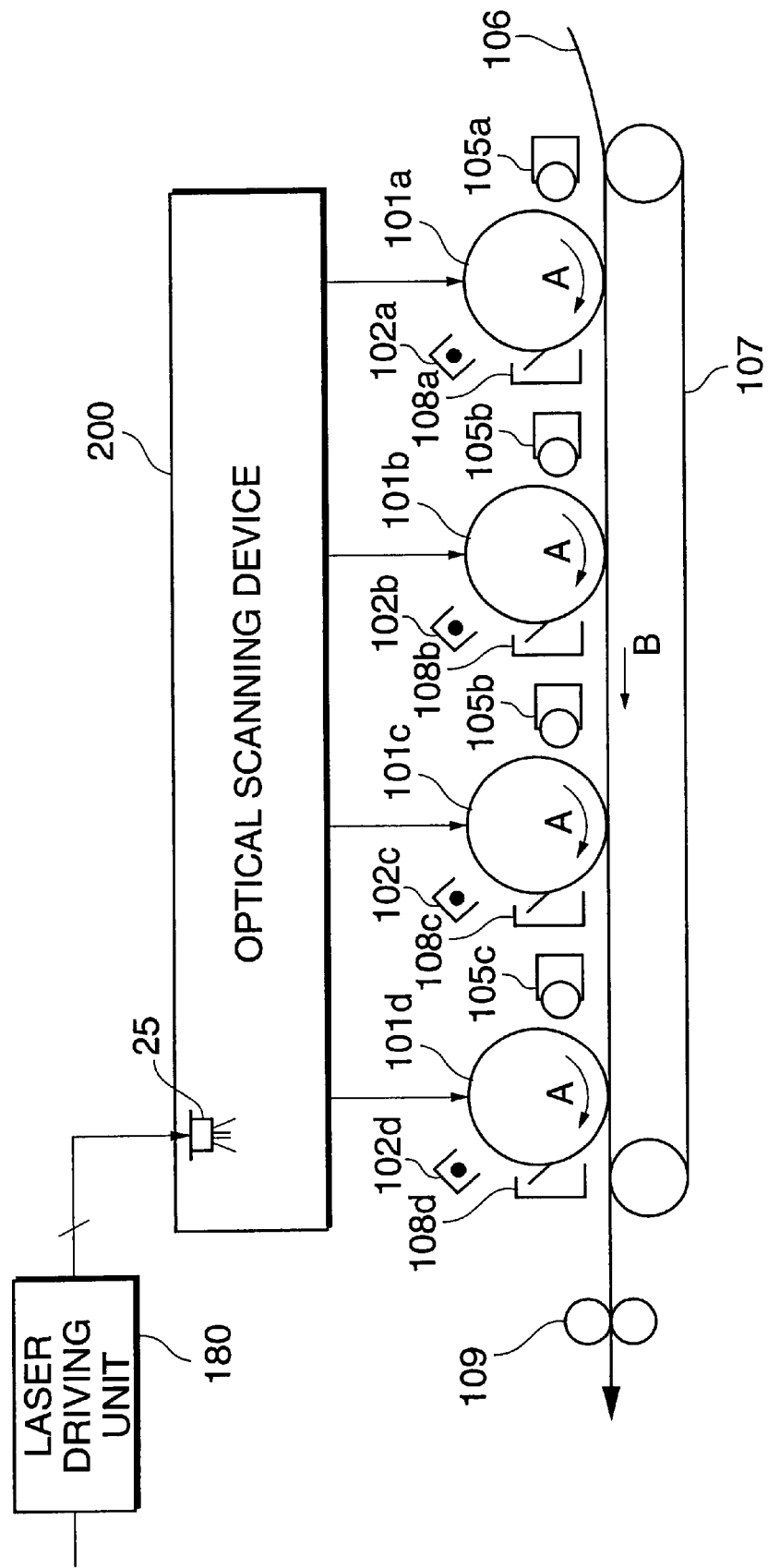
FIG. 20 is a schematic block diagram of one embodiment of an image forming apparatus according to the present invention.

FIG. 20 is a schematic block diagram showing one embodiment of an image forming apparatus according to the present invention. The same reference numerals as those of FIG. 9 designate the same components as those of the conventional image forming apparatus shown in FIG. 9, and only the differences will be described.

A laser driving unit 180 drives a semiconductor laser array 25 for generating each modulation data piece for modulating the respective light beams corresponding to C, M, Y, K emitted from the semiconductor layer array 25 according to the image data input from the outside to modulate the respective light beams according to each modulation data piece.

An optical scanning device 200 including the semiconductor laser array 25 is the optical scanning device as the embodiment of the present invention shown in FIG. 1 or FIG. 12, and the photoreceptors 101a, 101b, 101d are scanned by the respective light beams modulated according to the image data corresponding to C, M, Y, K emitted from the optical scanning device 200 to form electrostatic latent images on the photoreceptor drums.

Figure 9:
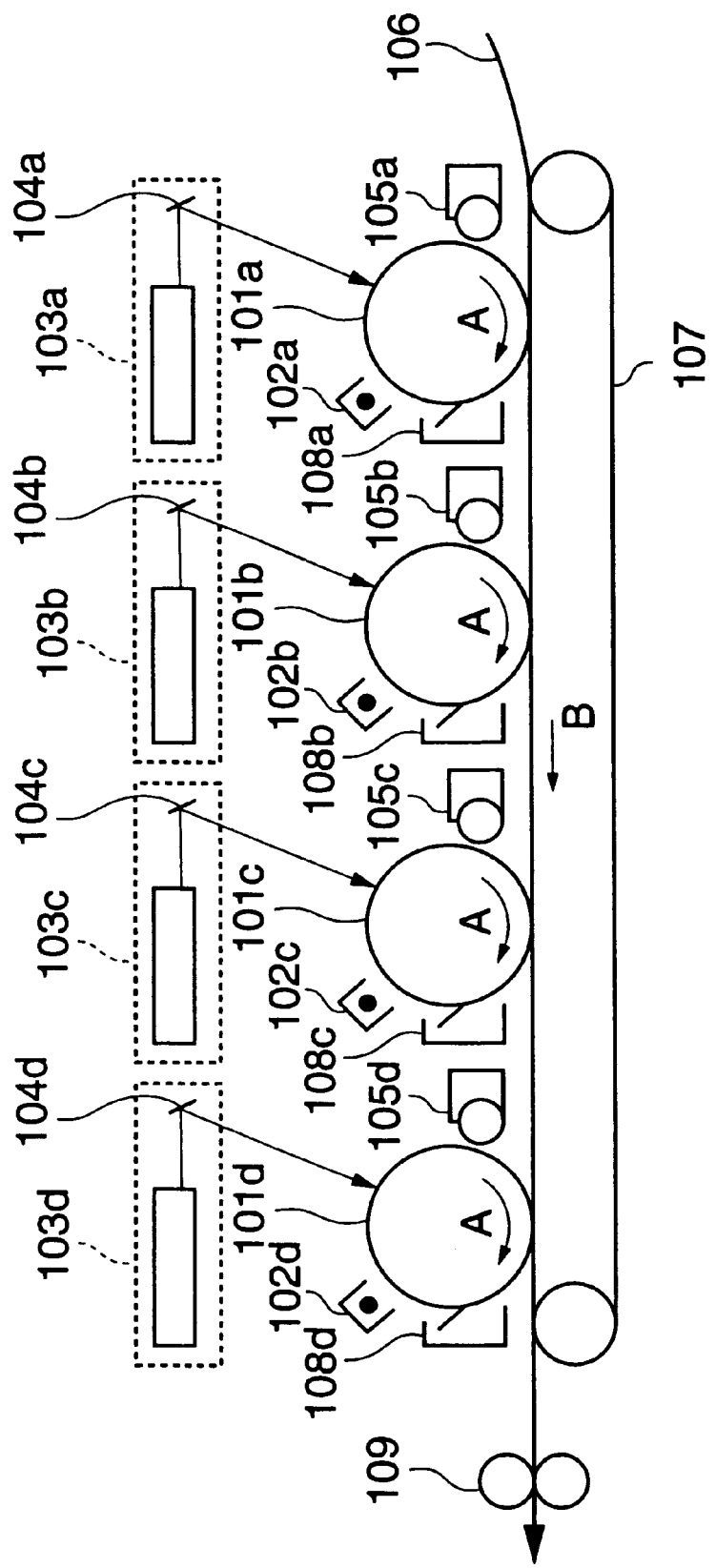
FIG. 9 is a schematic block diagram of the conventional tandem color image forming apparatus.
Figure 10:
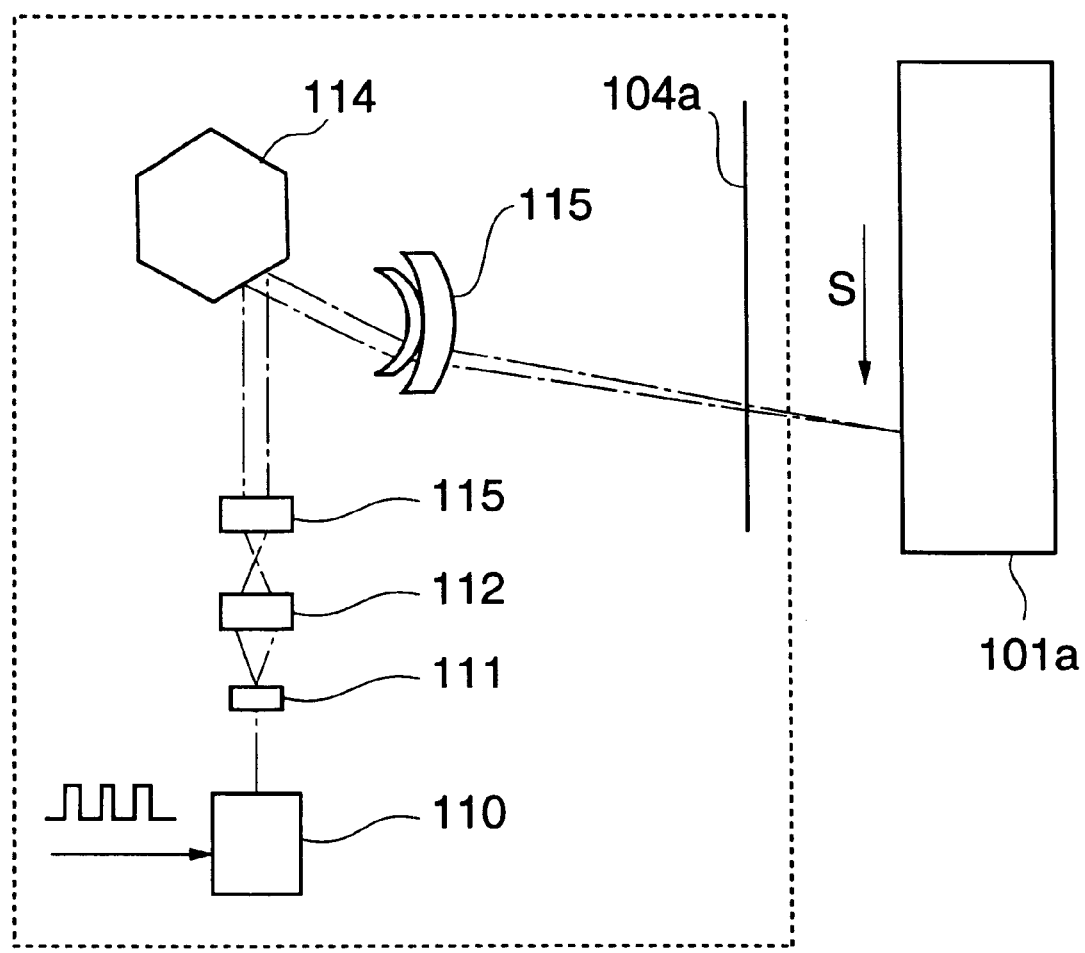
FIG. 10 is a schematic block diagram of an optical scanning device used in the conventional color image forming apparatus.

The other structural part and the general sequence of the image forming apparatus shown in FIG. 20 are the same as those of the image forming apparatus shown in FIG. 9, so the description is omitted.

According to the present invention, as described above, the optical scanning device has two mirror surfaces for reflecting the corresponding light beam, one time each, among plural light beams separated by the separating optical system as the beam corresponding optical system, whereby it is possible to implement the optical scanning device for color image formation, which is capable of reducing color aberration depending on variation in the image formation position on the scanned surface caused by the angle change of the optical system.

One mirror surface of the two mirror surfaces is a concave cylindrical mirror surface, and the other mirror surface is a plane mirror surface, thereby further restraining color aberration depending on the variation in the image formation position on the scanned surface to obtain an image of high image quality.

Further, the cylindrical mirror is disposed on the downstream side of the optical path of the light beam from the plane mirror, thereby further restraining color aberration depending on the variation in the image formation position on the scanned surface to obtain an image of higher image quality.

Further, the two mirrors are integrally held in a V shape, and when the two mirrors are not held integrally, the optical

TABLE 16

| | Optical system of Fig. 18A | | Optical system of Fig. 18B | |
| --- | --- | --- | --- | --- |
| | Beam diameter in slow-scanning direction on outside photoreceptors 24a, 24d | Beam diameter in slow-scanning direction on inside photoreceptors 24b, 24c | Beam diameter in slow-scanning direction on outside photoreceptors 24a, 24d | Beam diameter in slow-scanning direction on inside photoreceptors 24b, 24c |
| SCANNING START POINT | 80.1 μm | 81.0 μm | 80.7 μm | 78.7 μm |
| SCANNING CENTER | 85.3 μm | 88.0 μm | 83.8 μm | 85.5 μm |
| SCANNING END POINT | 78.6 μm | 79.0 μm | 78.3 μm | 76.6 μm | path between the two mirrors is kept from intersecting the plane formed by the optical path of the light beam deflected by the light beam deflecting unit, thereby further restraining the occurrence of color aberration.

Further, according to the present invention, the image forming apparatus is capable of forming an image of high image quality in which color aberration is restrained.

What is claimed is:

1. An optical scanning device, comprising a light beam emitting part that emits plural light beams, a deflecting part that commonly deflects plural light beams emitted from the light beam emitting part, a separating optical system that separates the plural light beams deflected by the deflecting part from each other, and respective optical systems respectively corresponding to the plural light beams that guide the plural light beams separated by the separating optical system to the respective designated scanned surfaces, wherein the respective optical systems respectively include a reflecting member having two mirror surfaces arranged like a V-shape for reflecting the corresponding light beam, one time each, among the plural light beams separated by the separating optical system.

2. The optical scanning device according to claim 1, wherein one mirror surface of the two mirror surfaces is a concave cylindrical mirror surface, and the other mirror surface is a plane mirror surface.

3. The optical scanning device according to claim 2, wherein the cylindrical mirror surface is arranged on the downstream side of the optical path of the light beam from the plane mirror surface.

4. An optical scanning device, comprising a light beam emitting unit that emits plural light beams comprising at least three light beams, a light beam deflecting unit that commonly deflects the plural light beams emitted from the light beam emitting unit a separating optical system that separates the plural light beams deflected by the light beam deflecting unit from each other, and respective optical systems respectively corresponding to the plural light beams that guide the plural light beams separated by the separating optical system to the respective designated scanned surfaces, wherein the respective optical system respectively have two mirror surfaces for reflecting the corresponding light beam, one time each, among the plural light beams separated by the separating optical system.

5. The optical scanning device according to claim 4, wherein the separating optical system is formed by a single separating optical element for separating the plural light beams from each other.

6. The optical scanning device according to claim 4, wherein the two mirror surfaces are fixed to a support member common to the two mirror surfaces.

7. The optical scanning device according to claim 4, wherein the two mirror surfaces are individually fixed to separate support members.

8. The optical scanning device according to claim 4, wherein the two mirror surfaces constituting the beam corresponding optical system are arranged on the same side of a space halved by a plane formed by the optical path of a light beam deflected by the light beam deflecting unit in each one beam corresponding optical system.

9. The optical scanning device according to claim 4, wherein the beam corresponding optical systems are respectively adapted to guide light beams separated by the separating optical system to the corresponding scanned surface through an optical path free from intersecting a plane formed by the optical path of a light beam deflected at the light beam deflecting unit.

10. The optical scanning device according to claim 4, wherein the separating optical system and the beam corresponding optical systems are adapted to keep each optical path length of the plural light beams between each deflecting point at the light beam deflecting unit and the irradiated point on each scanned surface equal to each other.

11. The optical scanning device according to claim 4, wherein the two mirror surfaces are formed by the mirror surfaces of separate mirrors, or two mirror surfaces constituting one prism.

12. An image forming apparatus, which comprises plural photoreceptors where an electrostatic latent image is recorded by light beams modulated according to the image data, and is adapted to develop plurality electrostatic latent images formed on the plural photoreceptors with toner of respective colors to form toner images of the respective colors, and finally transfer and fix the respective toner images on a designated recording medium to record the images on a recording medium, wherein the image forming apparatus includes an optical scanning device having: a light beam emitting unit that emits plural light beams comprising at least three light beams respectively modulated according to data of each image; a light beam deflecting unit that commonly deflects the plural light beams emitting from the light beam emitting unit, a separating optical system that separates the plural light beams deflected by the light beam deflecting unit from each other; and respective optical systems respectively corresponding to the plural light beams that guide the plural light beams separated by the separating optical system to the plural photoreceptors, respectively, the respective optical systems being respectively provided with two mirror surfaces for reflecting the corresponding light beam, one time each, among the plural light beams separated by the separating optical system.

13. An optical scanning device, comprising:

a light beam emitting unit that emits plural light beams;

a light beam deflecting unit that commonly deflects the plural light beams emitted from the light beam emitting unit;

a separating optical system that separates the plural light beams deflected by the light beam deflecting unit from each other; and respective optical systems respectively corresponding to the plural light beams that guide the plural light beams separated by the separating optical system to the respective designated scanned surfaces, wherein, the respective optical systems respectively have two mirror surfaces for reflecting the corresponding light beam, one time each, among the plural light beams separated by the separating optical system, the two mirror surfaces are fixed to a support member common to the two mirror surfaces.

14. An image forming apparatus, which comprises:

plural photoreceptors where an electrostatic latent image is recorded by light beams modulated according to the image data, and is adapted to develop plural electrostatic latent images formed on the plural photoreceptors with toner of respective colors to form toner images of the respective colors, and finally transfer and fix the respective toner images on a designated recording medium to record the images on the recording medium, wherein the image forming apparatus includes:

an optical scanning device having a light beam emitting unit that emits plural light beams respectively modulated according to data of each image;

a light beam deflecting unit that commonly deflects the plural light beams emitted form the light beam emitting unit;

a separating optical system that separates the plural light beams deflected by the light beam deflecting unit from each other; and respective optical systems respectively corresponding to the plural light beams that guide the plural light beams separated by the separating optical system to the plural photoreceptors, respectively, the respective optical systems being respectively provided with two mirror surfaces for reflecting the corresponding light beam, one time each, among the plural light beams separated by the separating optical system, the two mirror surfaces are fixed to a support member common to the two mirror surfaces.

* * * * *